(12) United States Patent
Ichikawa et al.

(10) Patent No.: US 7,965,451 B2
(45) Date of Patent: Jun. 21, 2011

(54) ZOOM LENS AND ELECTRONIC IMAGING APPARATUS USING THE SAME

(75) Inventors: Keisuke Ichikawa, Hachioji (JP); Masahito Ohashi, Hachioji (JP); Masato Miyata, Machida (JP)

(73) Assignee: Olympus Imaging Corp., Tokyo (JP)

(*) Notice: Subject to any disclaimer, the term of this patent is extended or adjusted under 35 U.S.C. 154(b) by 285 days.

(21) Appl. No.: 12/316,296

(22) Filed: Dec. 10, 2008

(65) Prior Publication Data
US 2009/0153979 A1 Jun. 18, 2009

(30) Foreign Application Priority Data

Dec. 12, 2007 (JP) ................................ 2007-321067
Nov. 19, 2008 (JP) ................................ 2008-295624

(51) Int. Cl.
*G02B 15/14* (2006.01)
(52) U.S. Cl. ........................................ 359/686; 359/676
(58) Field of Classification Search .......... 359/680–682, 359/676, 686
See application file for complete search history.

(56) References Cited

U.S. PATENT DOCUMENTS

| 6,888,683 | B2 | 5/2005 | Itoh | |
|---|---|---|---|---|
| 7,382,547 | B2* | 6/2008 | Satori | 359/682 |
| 2006/0285222 | A1* | 12/2006 | Kanetaka | 359/680 |
| 2007/0229972 | A1* | 10/2007 | Satori | 359/686 |

FOREIGN PATENT DOCUMENTS

| JP | 2002-365543 | 12/2002 |
|---|---|---|
| JP | 2004-31807 | 11/2004 |

* cited by examiner

*Primary Examiner* — Joseph Martinez
*Assistant Examiner* — James R Greece
(74) *Attorney, Agent, or Firm* — Kenyon & Kenyon LLP

(57) ABSTRACT

A zoom lens includes, in order from the object side, a first lens unit with negative power, a second lens unit with positive power, a third lens unit with positive power, and a fourth lens unit. When the magnification of the zoom lens is changed in the range from a wide-angle position to a telephoto position, spacing between the first lens unit and the second lens unit is narrowed and spacing between the second lens unit and the third lens unit is widened. An aperture stop moved integrally with the second lens unit is interposed between the most image-side lens element of the first lens unit and the most image-side lens element of the second lens unit. The first lens unit has, in order from the object side, a negative lens element and a positive lens element and satisfies the following conditions:

$$0.15 < \phi_{1MF}/\phi_{1MR} < 1.0$$

$$-3.0 < \phi_{1PF}/\phi_{1PR} < -1.0$$

where $\phi_{1MF}$ is the power of the object-side surface of the negative lens element, $\phi_{1MR}$ is the power of the image-side surface of the negative lens element, $\phi_{1PF}$ is the power of the object-side surface of the positive lens element, and $\phi_{1PR}$ is the power of the image-side surface of the positive lens element.

38 Claims, 10 Drawing Sheets

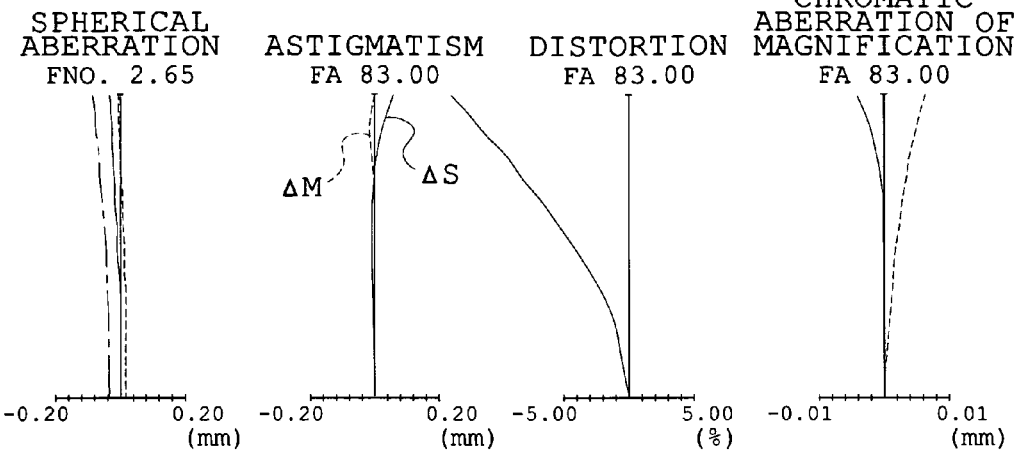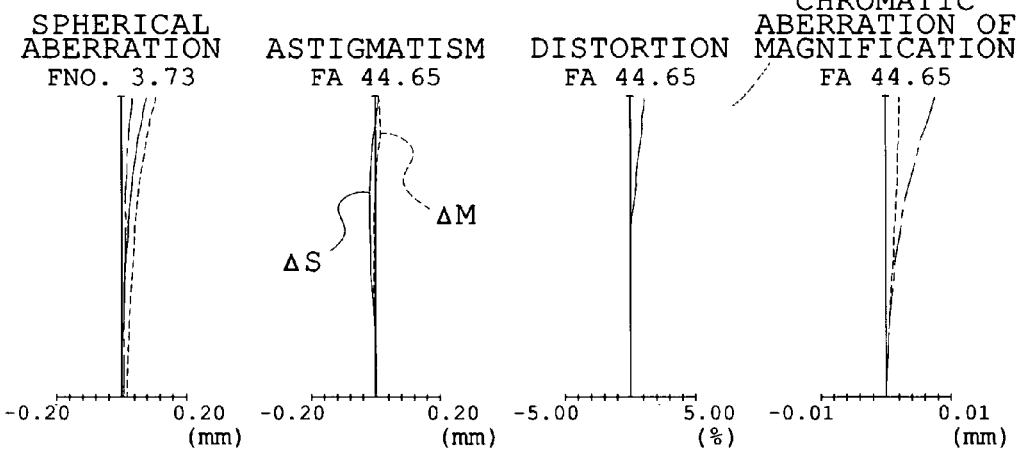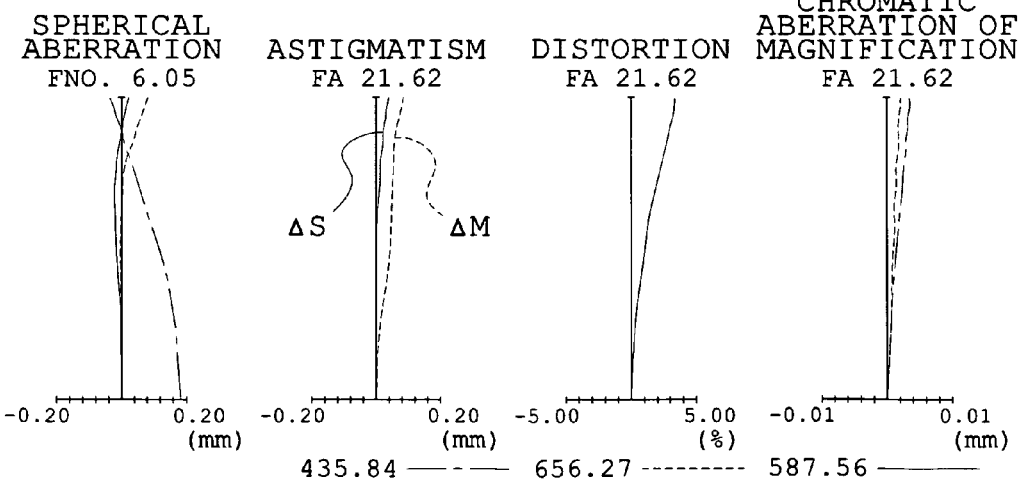

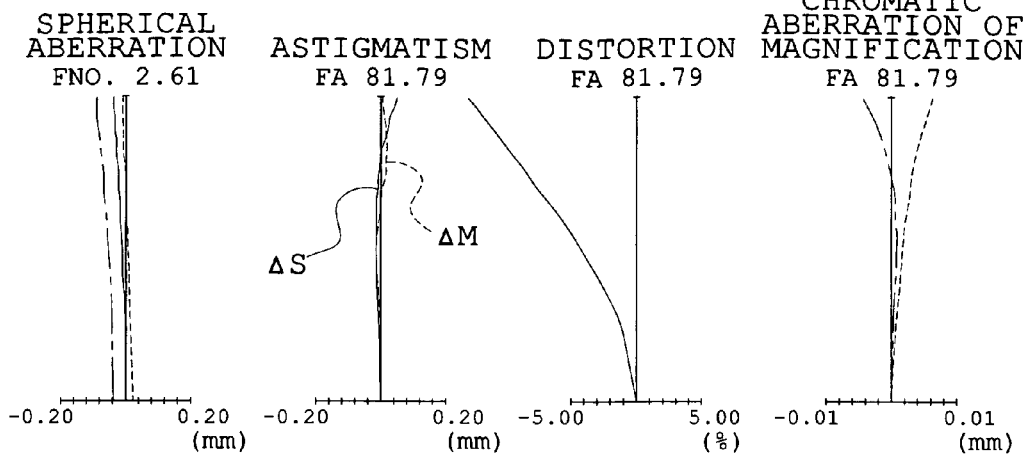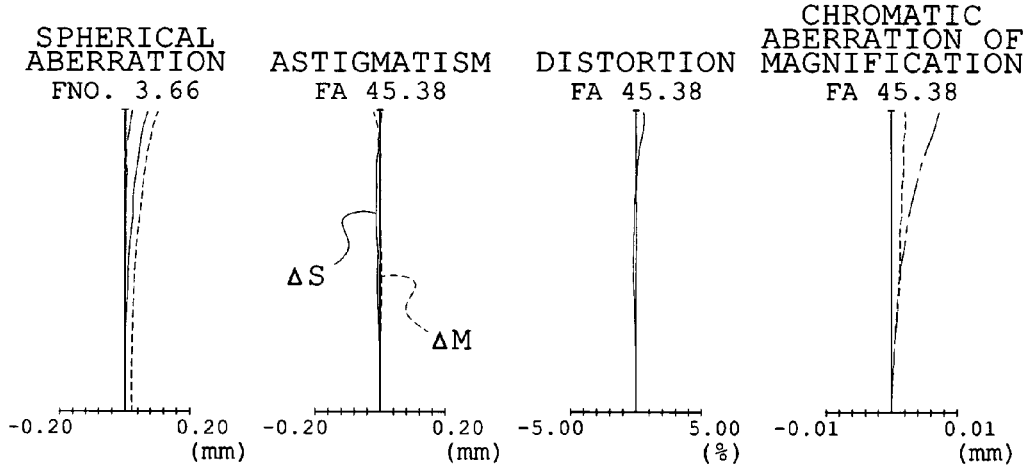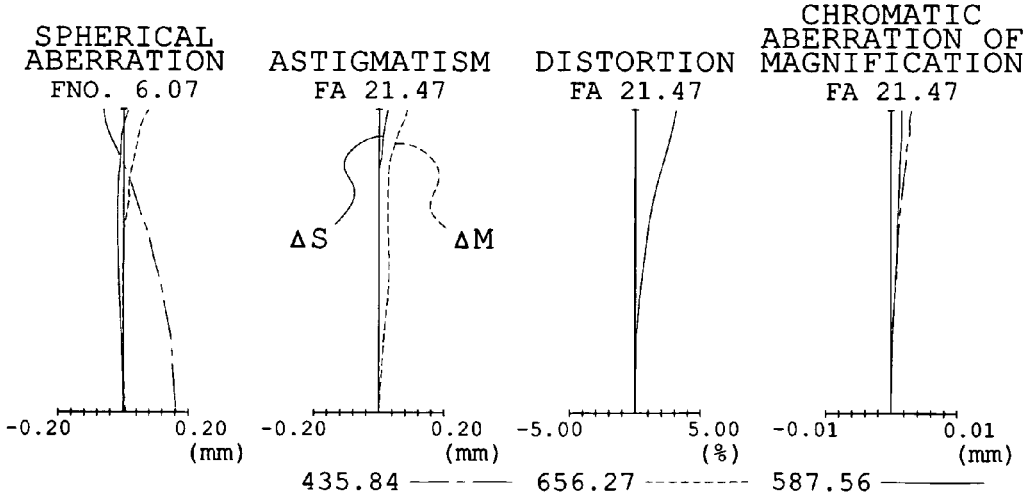

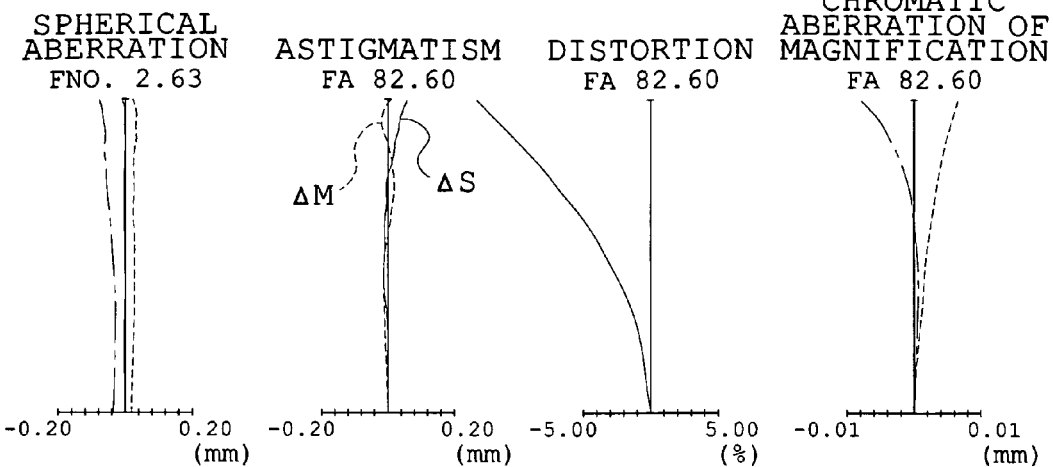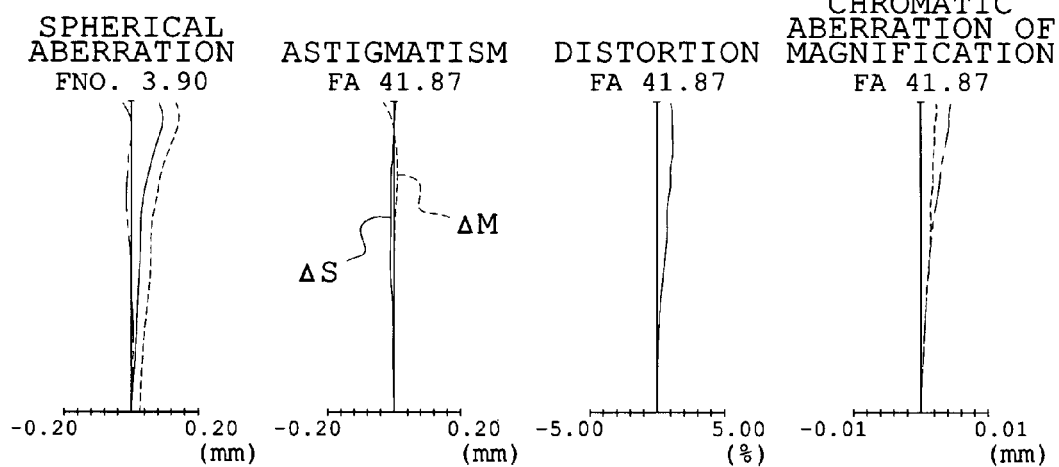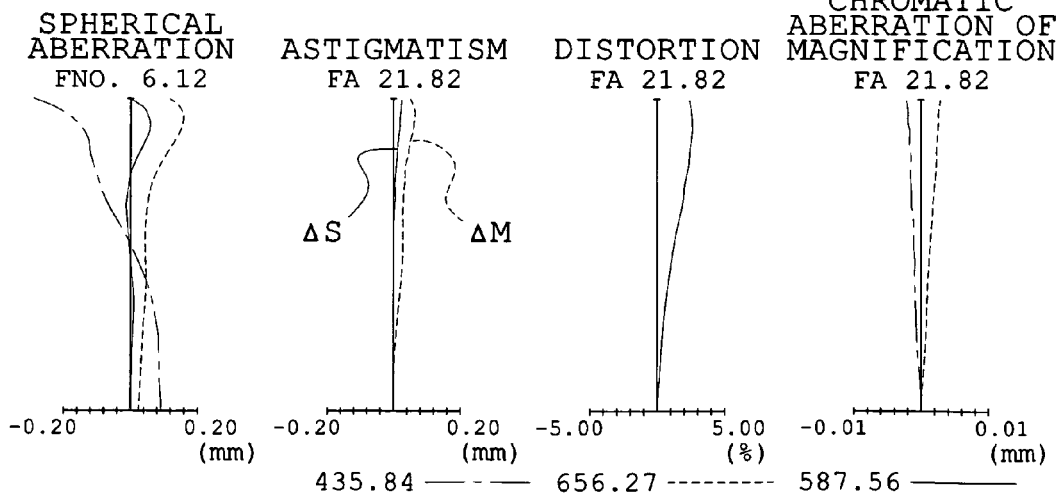

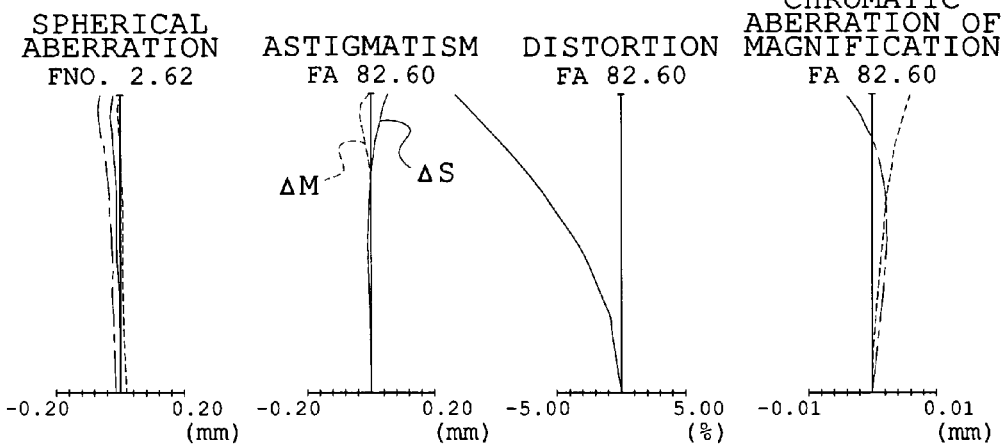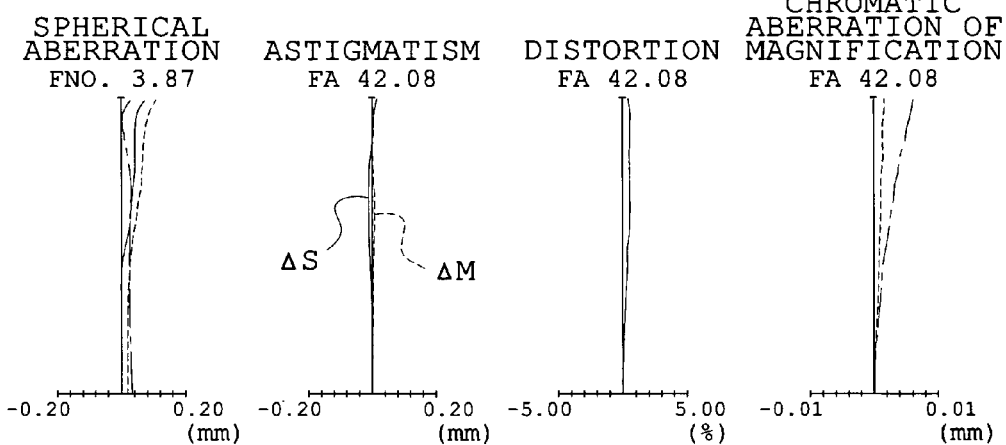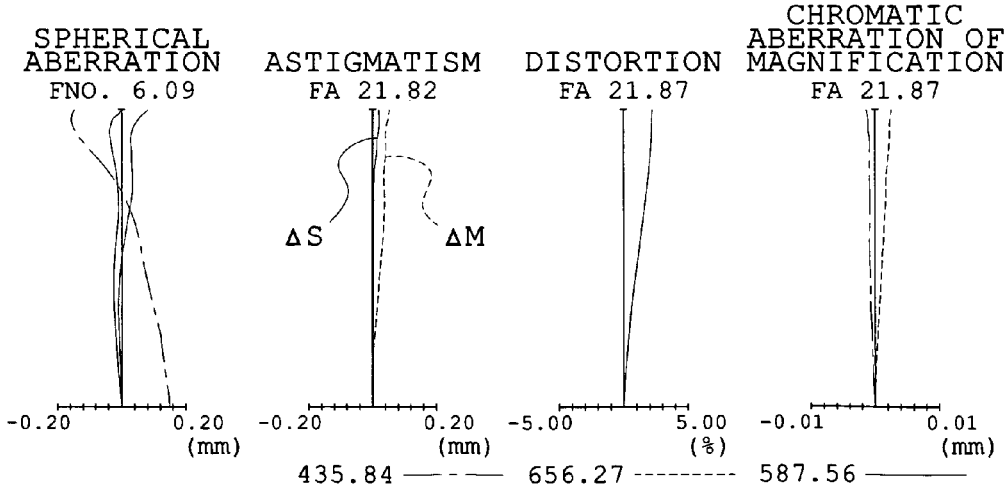

ZOOM LENS AND ELECTRONIC IMAGING APPARATUS USING THE SAME

This application claims benefits of Japanese Patent Application No. 2007-321069 filed in Japan on Dec. 12, 2007, the contents of which are incorporated herein by reference.

BACKGROUND OF THE INVENTION

1. Field of the Invention

This invention relates to a zoom lens and an electronic imaging apparatus using this zoom lens.

2. Description of Related Art

In recent years, instead of silver-halide film cameras, digital cameras provided with solid-state image sensors, such as CCDs (charge coupled devices) and CMOSs (complementary metal-oxide semiconductors), have constituted the main current. Such digital cameras are available in various types ranging from a high-function type for business use to a popular compact type. Of these, the popular compact type of digital camera has come to require a slim design, in addition to a compact design, so that the camera can be easily put into the pocket of clothing or a bag and is handy to carry, in order to meet the need of a user who wants to readily enjoy photography. Consequently, for a zoom lens used in the popular compact type of digital camera, a compacter design is required and at the same time, it is also required to have satisfactory brightness, a high variable magnification ratio exceeding 3, and the property that a field angle in a diagonal direction is more than 70°.

Each of Japanese Patent Kokai Nos. 2004-318107 and 2002-365543 sets forth an optical system which is a zoom lens applicable to the popular compact type of digital camera and comprises, in order from the object side, a first lens unit with negative power, a second lens unit with positive power, a third lens unit with positive power, and a fourth lens unit.

SUMMARY OF THE INVENTION

The zoom lens of the present invention comprises, in order from the object side, a first lens unit with negative power, a second lens unit with positive power, a third lens unit with positive power, and a fourth lens unit. When the magnification of the zoom lens is changed in the range from a wide-angle position to a telephoto position, spacing between the first lens unit and the second lens unit is narrowed and spacing between the second lens unit and the third lens unit is widened. An aperture stop moved integrally with the second lens unit is interposed between the most image-side lens element of the first lens unit and the most image-side lens element of the second lens unit. The first lens unit consists of a first lens element with negative power placed on the object side and a second lens element with positive power placed on the image side and satisfies the following conditions:

$$0.15 < \phi_{1MF}/\phi_{1MR} < 1.0 \qquad (1)$$

$$-3.0 < \phi_{1PF}/\phi_{1PR} < -1.0 \qquad (2)$$

where $\phi_{1MF}$ is the power of the object-side surface of the first lens element with negative power of the first lens unit, $\phi_{1MR}$ is the power of the image-side surface of the first lens element with negative power of the first lens unit, $\phi_{1PF}$ is the power of the object-side surface of the second lens element with positive power of the first lens unit, and $\phi_{1PR}$ is the power of the image-side surface of the second lens element with positive power of the first lens unit.

Also, in the zoom lens of the present invention, it is desirable that when it is constructed to satisfy Conditions (1) and (2), both surfaces of the first lens element with negative power of the first lens unit are aspherical.

The zoom lens of the present invention comprises, in order from the object side, a first lens unit with negative power, a second lens unit with positive power, a third lens unit with positive power, and a fourth lens unit. When the magnification of the zoom lens is changed in the range from a wide-angle position to a telephoto position, spacing between the first lens unit and the second lens unit is narrowed and spacing between the second lens unit and the third lens unit is widened. An aperture stop moved integrally with the second lens unit is interposed between the most image-side lens element of the first lens unit and the most image-side lens element of the second lens unit. The first lens unit consists of a first lens element with negative power placed on the object side and a second lens element with positive power placed on the image side. Each of the third lens unit and the fourth lens unit consists of only a single meniscus lens element with a concave surface facing the object side.

Also, in the zoom lens of the present invention, it is desirable that each of the third lens unit and the fourth lens unit, when consisting of only a single meniscus lens element with a concave surface facing the object side, satisfies the following condition:

$$15 < (\phi 3/\phi 4) < 320 \qquad (3)$$

where $\phi 3$ is the power of the third lens unit and $\phi 4$ is the power of the fourth lens unit.

In the zoom lens of the present invention, it is desirable that each of the third lens unit and the fourth lens unit, when consisting of only a single meniscus lens element with a concave surface facing the object side, satisfies the following condition:

$$-10 < (R_{3r}+R_{4f})/(R_{3r}-R_{4f}) < 0 \qquad (4)$$

where $R_{3r}$ is a paraxial radius of curvature of the image-side surface of the meniscus lens element constituting the third lens unit and $R_{4f}$ is a paraxial radius of curvature of the object-side surface of the meniscus lens element constituting the fourth lens unit.

In the zoom lens of the present invention, it is desirable that each of the third lens unit and the fourth lens unit, when consisting of only a single meniscus lens element with a concave surface facing the object side, satisfies the following condition:

$$1 < ds/dt < 1.5 \qquad (5)$$

where ds is spacing between a point where a line parallel with the optical axis, traversing the maximum image height position on the imaging surface intersects with the image-side surface of the meniscus lens element constituting the third lens unit and a point where the line intersects with the object-side surface of the meniscus lens element constituting the fourth lens unit at the wide-angle position and dt is spacing on the optical axis between the image-side surface of the meniscus lens element constituting the third lens unit and the object-side surface of the meniscus lens element constituting the fourth lens unit at the wide-angle position.

In the zoom lens of the present invention, it is desirable to satisfy the following condition:

$$6 \leq N \leq 9 \qquad (6)$$

where N is the total number of lens elements of the zoom lens.

In the zoom lens of the present invention, it is desirable that the second lens unit is constructed with three lens elements or less.

In the zoom lens of the present invention, it is desirable that the second lens unit comprises a lens element with positive power and a cemented lens component in which a lens element with positive power and a lens element with negative power are cemented.

In the zoom lens of the present invention, it is desirable that the second lens unit comprises a cemented lens component in which a lens element with positive power and a lens element with negative power are cemented, and the lens element with negative power of the cemented lens component is smaller in Abbe's number than the lens element with positive power of the cemented lens component.

In the zoom lens of the present invention, it is desirable that when the second lens unit includes a lens element with positive power and a cemented lens component in which a lens element with positive power and a lens element with negative power are cemented, the second lens unit satisfies the following conditions:

$$n_{2pave} \geq 1.59 \tag{7}$$

$$\nu_{2n} \leq 35 \tag{8}$$

where $n_{2pave}$ is an average refractive index value of all lens elements with positive power contained in the second lens unit and $\nu_{2n}$ is the Abbe's number of the lens element with negative power contained in the second lens unit.

In the zoom lens of the present invention, it is desirable that when the second lens unit includes a lens element with positive power and a cemented lens component in which a lens element with positive power and a lens element with negative power are cemented, spacing between the lens element and the lens component constituting the second lens unit is smaller than a center thickness of the lens element with negative power contained in the second lens unit.

In the zoom lens of the present invention, it is desirable to satisfy the following conditions:

$$n_{3ave} \geq 1.48 \tag{9}$$

$$\nu_{3ave} \geq 60 \tag{10}$$

where $n_{3ave}$ is an average refractive index value of all lens elements constituting the third lens unit and $\nu_{3ave}$ is an average Abbe's number value of all lens elements constituting the third lens unit.

In the zoom lens of the present invention, it is desirable that the third lens unit is constructed with a single lens element having at least one aspherical surface.

In the zoom lens of the present invention, it is desirable that the third lens unit is constructed with at least one resin lens element.

In the zoom lens of the present invention, it is desirable that the fourth lens unit consists of a single lens element and satisfies the following conditions:

$$n_4 \geq 1.48 \tag{11}$$

$$\nu_4 \geq 60 \tag{12}$$

where $n_4$ is the refractive index of the single lens element constituting the fourth lens unit and $\nu_4$ is the Abbe's number of the single lens element constituting the fourth lens unit.

In the zoom lens of the present invention, it is desirable that the fourth lens unit consists of a single lens element having at least one aspherical surface.

In the zoom lens of the present invention, it is desirable that the fourth lens unit consists of a single resin lens element.

In the zoom lens of the present invention, it is desirable that the fourth lens unit remains fixed when the magnification is changed.

The electronic imaging apparatus of the present invention comprises a zoom lens, an electronic image sensor located proximate to an imaging position of the zoom lens, an image processing means, and a recording means. Image data obtained by the electronic image sensor are processed by the image processing means so that a data shape is changed and recorded in the recording means. In this case, the zoom lens is any zoom lens described above and satisfies the following condition in nearly infinite object point focusing:

$$0.7 < y_{07}/(f_w \cdot \tan \omega_{07w}) < 1.5 \tag{13}$$

where $y_{07}$ is expressed by $y_{07} = 0.7\, y_{10}$ when $y_{10}$ denotes a distance from the center to a point farthest from the center (the maximum image height) within an effective imaging surface (an imageable surface) of the electronic image sensor and $\omega_{07w}$ is an angle made by a direction of an object point corresponding to an image point, connecting the center of the imaging surface at wide-angle position and the position of the image height $y_{07}$, with the optical axis.

According to the present invention, it is possible to provide the zoom lens which is advantageous for compact, wide-angle, and high variable magnification designs, favorable in photographic image quality, and easy in fabrication and the electronic imaging apparatus using this zoom lens.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2D, 2E-2H, and 2I-2L are diagrams showing aberration characteristics at wide-angle, middle, and telephoto positions, respectively, in infinite object point focusing of the zoom lens shown in FIGS. 1A-1C.

FIGS. 4A-4D, 4E-4H, and 4I-4L are diagrams showing aberration characteristics at wide-angle, middle, and telephoto positions, respectively, in infinite object point focusing of the zoom lens shown in FIGS. 3A-3C.

FIGS. 6A-6D, 6E-6H, and 6I-6L are diagrams showing aberration characteristics at wide-angle, middle, and telephoto positions, respectively, in infinite object point focusing of the zoom lens shown in FIGS. 5A-5C.

FIGS. 8A-8D, 8E-8H, and 8I-8L are diagrams showing aberration characteristics at wide-angle, middle, and telephoto positions, respectively, in infinite object point focusing of the zoom lens shown in FIGS. 7A-7C.

DETAILED DESCRIPTION OF THE PREFERRED EMBODIMENTS

Figure 1A:
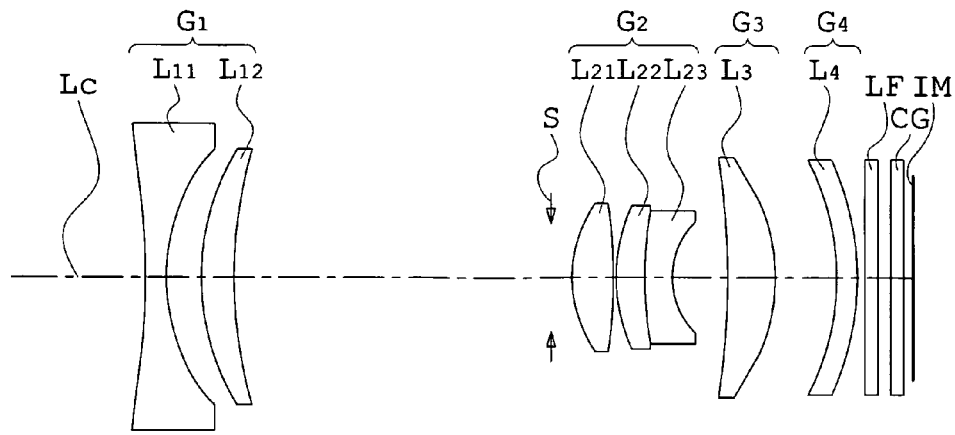
FIGS. 1A, 1B, and 1C are sectional views showing optical arrangements, developed along the optical axis, at wide-angle, middle, and telephoto positions, respectively, in infinite object point focusing of the zoom lens according to Embodiment 1 of the present invention.

Before undertaking the description of the embodiments of the zoom lens and the electronic imaging apparatus using it in the present invention, the function and effect of the present invention will be explained.

The zoom lens of the present invention comprises, as a fundamental arrangement, in order from the object side, the first lens unit with negative power, the second lens unit with positive power, the third lens unit with positive power, and the fourth lens unit and is constructed so that when the magnification of the zoom lens is changed in the range from the wide-angle position to the telephoto position, spacing between the first lens unit and the second lens unit is narrowed and spacing between the second lens unit and the third lens unit is widened.

In the zoom lens of the present invention adopting such an arrangement, since the first lens unit has the negative power, a wide-angle design and a compact design in a radial direction are attained and the number of constituent lens units can be reduced. In addition, since the number of lens units can be reduced, it also becomes possible to reduce the number of necessary lenses and as a result, a slim design of a lens frame and a reduction in cost can be attained. The second lens unit is such as to play the role of a variator by changing a distance from the first lens unit and is such as to have the positive power in order to move from the image side toward the object side and increase the magnification when the magnification is changed in the range from the wide-angle position to the telephoto position. The third lens unit has the positive power and thus performance is easily ensured when the overall lens length is reduced, and compactness becomes possible. Aberrations, such as astigmatism and curvature of field, yielded in the second lens unit that formerly have been mainly corrected by the first lens unit can now be corrected by the fourth lens unit that is the last lens unit. Hence, there is no need to make more correction for the aberrations, such as astigmatism and curvature of field, than is necessary in the first lens unit, and spherical aberration and coma increased by the high variable magnification design can be completely corrected.

The zoom lens of the present invention has, as a fundamental arrangement, an aperture stop moved integrally with the second lens unit, interposed between the most image-side lens element of the first lens unit and the most-image side lens element of the second lens unit.

The zoom lens of the present invention adopting such an arrangement is such as to easily secure performance at the wide-angle position while maintaining compactness. The aperture stop is moved integrally with the second lens unit and thereby a driving mechanism can be simplified. Also, when an arrangement is such that the aperture stop is not moved integrally with the second lens unit and is located at a more object-side position than in the above description at the wide-angle position, the ray height of a marginal beam in the second lens unit is increased and hence oversizing of individual lens elements constituting the second lens unit is caused in their radial directions. In addition, since the second lens unit mainly retains an imaging function of the entire lens system, each of the lens elements constituting the second lens unit needs to have relatively strong power. However, when the aperture stop is located at such a position, the number of lens elements must be increased to secure the power and it becomes difficult to attain the slim design of the lens frame and to hold the balance between spherical aberration and coma. In the case where the arrangement is such that the aperture stop is located on the image side of the second lens unit, the ray height of an off-axis beam is increased at the wide-angle position and thus the first lens unit must be enlarged and wide-angle and compact designs become difficult.

The zoom lens of the present invention is constructed so that, in addition to the fundamental arrangement, the first lens unit consists of the first lens element with negative power placed on the object side and the second lens element with positive power placed on the image side and satisfies the following conditions:

$$0.15 < \phi_{1MF}/\phi_{1MR} < 1.0 \quad (1)$$

$$-3.0 < \phi_{1PF}/\phi_{1PR} < -1.0 \quad (2)$$

where $\phi_{1MF}$ is the power of the object-side surface of the first lens element with negative power of the first lens unit, $\phi_{1MR}$ is the power of the image-side surface of the first lens element with negative power of the first lens unit, $\phi_{1PF}$ is the power of the object-side surface of the second lens element with positive power of the first lens unit, and $\phi_{1PR}$ is the power of the image-side surface of the second lens element with positive power of the first lens unit.

When the first lens unit consists of the first lens element with negative power and the second lens element with positive power, aberrations, such as spherical aberration and curvature of field, have been formerly corrected by concentrating most of the negative power of the first lens element on its object-side surface and at the same time, by concentrating most of the positive power of the second lens element on its image-side surface. However, when the power is concentrated in this way, it is difficult to attain the high variable magnification design because high-order spherical aberration is yielded. The influence of the high-order aberration attributable to variation on assembly becomes considerable and it is difficult to ensure satisfactory optical performance. Furthermore, since the power distribution of the first lens element becomes unbalanced, the lens element assumes the shape that the difference in thickness between a thin part and a thick part is considerable and must take the shape that the radius of curvature of the lens element is smaller in order to attain the wide-angle design, so that the fabrication of the lens element becomes difficult and the lens design is limited.

Thus, the zoom lens of the present invention is designed to satisfy Conditions (1) and (2) which provide the optimum power distribution to individual lens elements constituting the first lens unit. The zoom lens of the present invention satisfies Conditions (1) and (2), and hence even when the variable magnification ratio is increased to approximately 4, satisfactory optical performance can be secured and good productivity can be obtained.

Below the lower limit of Condition (1), high-order spherical aberration yielded in the first lens element of the first lens unit is increased and correction for spherical aberration becomes difficult over the entire zoom region. In addition, the first lens element of the first lens unit assumes the shape that the difference in thickness between a thin part and a thick part is considerable and the design is limited by lens workability. On the other hand, beyond the upper limit of Condition (1), corrections for spherical aberration and curvature of field which fluctuate when the magnification is changed become difficult, and similarly the satisfactory optical performance ceases to be obtainable over the entire zoom region.

Also, it is further desirable that, instead of satisfying Condition (1), the first lens unit is designed to satisfy one of the following conditions:

$$0.2 < \phi_{1MF}/\phi_{1MR} < 0.8 \quad (1)'$$

$$0.35 < \phi_{1MF}/\phi_{1MR} < 0.7 \quad (1)''$$

The upper or lower limit of Condition (1)' may be replaced with the upper or lower limit of Condition (1) or (1)", or the upper or lower limit of Condition (1)" may be replaced with the upper or lower limit of Condition (1) or (1)'.

Below the lower limit of Condition (2), the power of an air lens formed between the first lens element and the second lens element of the first lens unit is lessened and under curvature of field accompanied with the wide-angle design cannot be completely corrected. On the other hand, beyond the upper limit of Condition (2), the power of the air lens formed between the first lens element and the second lens element of the first lens unit is increased and curvature of field at the wide-angle position becomes over so that satisfactory optical performance cannot be secured. With the wide-angle design, spacing between edges of the first and second lens elements of the first lens unit is narrowed. Hence, spacing between these lens elements is widened and the thickness of the first lens unit in the direction along the optical axis is increased.

Also, it is further desirable that, instead of satisfying Condition (2), the first lens unit is designed to satisfy one of the following conditions:

$$-2.5 < \phi_{1PF}/\phi_{1PR} < -1.7 \quad (2)'$$

$$-2.0 < \phi_{1PF}/\phi_{1PR} < -1.8 \quad (2)''$$

The upper or lower limit of Condition (2)' may be replaced with the upper or lower limit of Condition (2) or (2)", or the upper or lower limit of Condition (2)" may be replaced with the upper or lower limit of Condition (2) or (2)'.

Also, it is desirable that when the zoom lens of the present invention is designed to satisfy Conditions (1) and (2) in addition to the fundamental arrangement, both surfaces of the first lens element of the first lens unit with negative power are aspherical.

By configuring both surfaces of the first lens element with negative power as aspherical surfaces, the occurrence of spherical aberration, curvature of field, and distortion can be suppressed.

In the zoom lens of the present invention, each of the third lens unit and the fourth lens unit consists of only a single meniscus lens element with a concave surface facing the object side in addition to the fundamental arrangement.

In the zoom lens of the present invention adopting such an arrangement, curvature of field in a minus direction produced over the entire zoom region by the second lens unit is corrected and the load of the first lens unit of correction for curvature of field is lessened to facilitate a proper power distribution. As a result, it becomes easy to correct aberration accompanied with the wide-angle design and the high variable magnification design. When the magnification is changed in the range from the wide-angle position to the telephoto position, the angle of incidence of the off-axis beam on the object-side surface of each of the third and fourth lens units is increased, and thus the optical path difference between the wide-angle position and the telephoto position becomes marked so that the fluctuation of high-order curvature of field due to the magnification change in a marginal portion can be suppressed.

Also, in the zoom lens of the present invention, it is desirable that each of the third lens unit and the fourth lens unit, when consisting of only the single meniscus lens element with a concave surface facing the object side in addition to the fundamental arrangement, satisfies the following condition:

$$15 < (\phi 3/\phi 4) < 320 \quad (3)$$

where $\phi 3$ is the power of the third lens unit and $\phi 4$ is the power of the fourth lens unit.

Condition (3) determines a proper correction function of curvature of field. Below the lower limit of Condition (3), curvature of field and astigmatism become over. Beyond the upper limit of Condition (3), the effect of correction for curvature of field is impaired, the load of the first lens unit is increased so that a proper power distribution cannot be done, and the high variable magnification design becomes difficult.

In the zoom lens of the present invention, it is desirable that each of the third lens unit and the fourth lens unit, when consisting of only the single meniscus lens element with a concave surface facing the object side in addition to the fundamental arrangement, satisfies the following condition:

$$-10 < (R_{3r} - R_{4f})/(R_{3r} - R_{4f}) < 0 \quad (4)$$

where $R_{3r}$ is a paraxial radius of curvature of the image-side surface of the meniscus lens element constituting the third lens unit and $R_{4f}$ is a paraxial radius of curvature of the object-side surface of the meniscus lens element constituting the fourth lens unit.

Condition (4) determines a proper lens configuration. When the radius of curvature of the most image-side surface of the third lens unit and the radius of curvature of the most object-side surface of the fourth lens unit are set within the upper and lower limits of Condition (4), space can be efficiently used and thus the zoom lens can be constructed as a compact arrangement.

In the zoom lens of the present invention, it is desirable that each of the third lens unit and the fourth lens unit, when consisting of only the single meniscus lens element with a concave surface facing the object side in addition to the fundamental arrangement, satisfies the following condition:

$$1 < ds/dt < 1.5 \quad (5)$$

where ds is spacing between a point where a line parallel with the optical axis, traversing the maximum image height position on the imaging surface intersects with the image-side surface of the meniscus lens element constituting the third lens unit and a point where the line intersects with the object-side surface of the meniscus lens element constituting the fourth lens unit at the wide-angle position and dt is spacing on the optical axis between the image-side surface of the meniscus lens element constituting the third lens unit and the object-side surface of the meniscus lens element constituting the fourth lens unit at the wide-angle position.

Condition (5) determines a proper lens configuration. When the space of the third lens unit and the fourth lens unit is set within the upper and lower limits of Condition (5), the space can be efficiently used and thus the zoom lens can be constructed as a compact arrangement.

In the zoom lens of the present invention, it is desirable to satisfy the following condition:

$$6 \leq N \leq 9 \quad (6)$$

where N is the total number of lens elements of the zoom lens.

When the value of N is set so as not to be below the lower limit of Condition (6), the power distributed to individual lens units of the zoom lens can be balanced and the occurrence of aberration is easily suppressed. When the value of N is set so as not to be beyond the upper limit of Condition (6), the number of constituent lens elements can be reduced.

In the zoom lens of the present invention, it is desirable that the second lens unit is constructed with three or less lens elements.

When the second lens unit is constructed with three lens elements, the entire optical system comes to have a compact arrangement.

In the zoom lens of the present invention, it is desirable that the second lens unit includes a lens element with positive power and a cemented lens component in which a lens element with positive power and a lens element with negative power are cemented.

When the second lens unit includes the lens element with positive power and the cemented lens component in which the lens element with positive power and the lens element with negative power are cemented, it becomes easy to correct aberration in the high variable magnification design and the wide-angle design.

Moreover, in the zoom lens of the present invention, it is desirable that when the second lens unit includes the lens element with positive power and the cemented lens component in which the lens element with positive power and the lens element with negative power are cemented, the second lens unit has the cemented lens component in which the lens element with positive power and the lens element with negative power are cemented and the lens element with negative power of the cemented lens component is smaller in Abbe's number than the lens element with positive power of the cemented lens component.

When the second lens unit includes the lens element with positive power and the cemented lens component in which the lens element with positive power and the lens element with negative power are cemented, the lens element with negative power of the cemented lens component is made smaller in Abbe's number than the lens element with positive power of the cemented lens component, and thereby it becomes easy to correct chromatic aberration and curvature of field.

In the zoom lens of the present invention, it is desirable that when the second lens unit includes the lens element with positive power and the cemented lens component in which the lens element with positive power and the lens element with negative power are cemented, the second lens unit satisfies the following conditions:

$$n_{2pave} \geq 1.59 \quad (7)$$

$$v_{2n} \leq 35 \quad (8)$$

where $n_{2pave}$ is an average refractive index value of all lens elements with positive power contained in the second lens unit and $v_{2n}$ is the Abbe's number of the lens element with negative power contained in the second lens unit.

When the refractive index is set so as not to be below the lower limit of Condition (7), correction for astigmatism is facilitated. When the Abbe's number is set so as not to be beyond the upper limit of Condition (8), chromatic aberration is easily corrected.

In the zoom lens of the present invention, it is desirable that spacing between the lens element and the lens component constituting the second lens unit is smaller than a center thickness of the lens element with negative power contained in the second lens unit. Such an arrangement facilitates the compact design.

In the zoom lens of the present invention, it is desirable to satisfy the following conditions:

$$n_{3ave} \geq 1.48 \quad (9)$$

$$v_{3ave} \geq 60 \quad (10)$$

where $n_{3ave}$ is an average refractive index value of all lens elements constituting the third lens unit and $v_{3ave}$ is an average Abbe's number value of all lens elements constituting the third lens unit.

In the case of the zoom lens in which the compact design is attained by the present invention, it is hard to correct astigmatism by the third lens unit in photography at the minimum focusing distance. It is thus desirable that the third lens unit is configured as a high-index and low-dispersion lens element as far as possible. For this, below the lower limits of Conditions (9) and (10), it becomes difficult to correct astigmatism and chromatic aberration.

It is more desirable that the third lens unit satisfies one of Conditions (9)' and (9)" described below, instead of Condition (9), and one of Conditions (10)' and (10)" described below, instead of Condition (10).

$$n_{3ave} \geq 1.50 \quad (9)'$$

$$n_{3ave} \geq 1.52 \quad (9)''$$

$$v_{3ave} \geq 58 \quad (10)'$$

$$v_{3ave} \geq 55 \quad (10)''$$

In the zoom lens of the present invention, it is desirable that the third lens unit is constructed with a single lens element having at least one aspherical surface.

In the case of the zoom lens in which the compact design is attained by the present invention, it is hard to correct astigmatism by the third lens unit in photography at the minimum focusing distance. It is thus desirable that the third lens unit is constructed with a lens element whose one or both surfaces are aspherical. Also, it is more desirable that this lens element has the shape that the image-side surface is greater in curvature than the object-side surface.

In the zoom lens of the present invention, it is desirable that the third lens unit is constructed with at least one resin lens element.

When the third lens unit is constructed with at least one resin lens element, the cost can be saved and lens molding is facilitated.

In the zoom lens of the present invention, it is desirable that the fourth lens unit is constructed with a single lens element and satisfies the following conditions:

$$n_4 \geq 1.48 \quad (11)$$

$$v_4 \geq 60 \quad (12)$$

where $n_4$ is the refractive index of the single lens element constituting the fourth lens unit and $v_4$ is the Abbe's number of the single lens element constituting the fourth lens unit.

In the case of the zoom lens in which the compact design is attained by the present invention, it is hard to correct astigmatism by the fourth lens unit in photography at the minimum focusing distance. It is thus desirable that the fourth lens unit is configured as a high-index and low-dispersion lens element as far as possible. For this, below the lower limits of Conditions (11) and (12), it becomes difficult to correct astigmatism and chromatic aberration.

It is more desirable that the fourth lens unit satisfies one of Conditions (11)' and (11)" described below, instead of Condition (11), and one of Conditions (12)' and (12)" described below, instead of Condition (12).

$$n_4 \geq 1.50 \tag{11}'$$

$$n_4 \geq 1.52 \tag{11}''$$

$$v_4 \geq 58 \tag{12}'$$

$$v_4 \geq 55 \tag{12}''$$

In the zoom lens of the present invention, it is desirable that the fourth lens unit is constructed with a single lens element having at least one aspherical surface.

In the case of the zoom lens in which the compact design is attained by the present invention, it is hard to correct astigmatism by the fourth lens unit in photography at the minimum focusing distance. It is thus desirable that the fourth lens unit is constructed with a single lens element having at least one aspherical surface. Also, it is more desirable that this lens element has the shape that the image-side surface is greater in curvature than the object-side surface.

In the zoom lens of the present invention, it is desirable that the fourth lens unit is constructed with a single resin lens element.

When the fourth lens unit is constructed with at least one resin lens element, the cost can be saved and lens molding is facilitated.

In the zoom lens of the present invention, it is desirable that the fourth lens unit is not moved when the magnification is changed.

When an arrangement is such that the fourth lens unit is not moved when the magnification is changed, a driving mechanism is simplified and compactness is easy.

The electronic imaging apparatus of the present invention comprises a zoom lens, an electronic image sensor located proximate to an imaging position of the zoom lens, an image processing means, and a recording means. Image data obtained by the electronic image sensor are processed by the image processing means so that a data shape is changed and recorded in the recording means. In this case, the zoom lens is any zoom lens described above and is designed to satisfy the following condition in nearly infinite object point focusing:

$$0.7 < y_{07}/(f_w \cdot \tan \omega_{07w}) < 1.5 \tag{13}$$

where $y_{07}$ is expressed by $y_{07} = 0.7 \, y_{10}$ when $y_{10}$ denotes a distance from the center to a point farthest from the center (the maximum image height) within an effective imaging surface (an imageable surface) of the electronic image sensor and $\omega_{07w}$ is an angle made by a direction of an object point corresponding to an image point, connecting the center of the imaging surface at wide-angle position and the position of the image height $y_{07}$, with the optical axis.

In the case of the zoom lens in which the compact design is attained by the present invention, when the zoom lens is downsized as in the present invention, a trade-off relation is liable to be brought about between correction for astigmatism and correction for barrel distortion. Consequently, when the occurrence of distortion is tolerated to a certain extent, the distortion of an image shape can be corrected by an image processing function of the electronic imaging apparatus. Thus, reference is made to such a correction method.

For example, it is assumed that an infinite object is imaged by an optical system free of distortion. In this case, a formed image is free from distortion and hence the following equation is established:

$$f = y/\tan \omega \tag{14}$$

where y is the height of an image point from the optical axis, f is the focal length of an imaging system, and ω is an angle made by the direction of an object point corresponding to the image point connected to the position of the height y from the center of the imaging surface with the optical axis.

On the other hand, in the optical system, when barrel distortion is tolerated only in the proximity of the wide-angle position, the following condition is obtained:

$$f > y/\tan \omega \tag{15}$$

That is, when the angle ω and the height y are set to constant values, the focal length f at the wide-angle position may remain long and correction for aberration is facilitated accordingly. The reason that a lens unit corresponding to the first lens unit of the zoom lens of the present invention is usually constructed with two lens components lies in the fact that corrections for distortion and astigmatism are made compatible. When the occurrence of distortion is tolerated to some extent, it is not necessary that corrections for distortion and astigmatism are made compatible, and correction for astigmatism is facilitated.

Thus, in the electronic imaging apparatus of the present invention, image data obtained by the electronic image sensor are electrically processed, corresponding to a change of the image shape, by the image processing means that is a signal processing system of the electronic imaging apparatus so that barrel distortion is corrected.

By doing so, the image data finally obtained provide a shape very similar to the object. Hence, it is only necessary to output the image of the object into a CRT and a printer in accordance with the image data.

Condition (13) determines the extent of barrel distortion at the wide-angle position. When Condition (13) is satisfied, astigmatism can be reasonably corrected and the slim design of the optical system becomes possible. Also, a barrel-distorted image is photoelectrically converted by the image sensor into barrel-distorted image data. However, in the barrel-distorted image data, a process corresponding to the change of the image shape is applied by the image processing means. By doing so, even when the final image data are reproduced, an image that is corrected for distortion and is very similar in shape to the object is obtained.

Beyond the upper limit of Condition (13), notably in a value close to 1, distortion is optically well corrected, but correction for astigmatism becomes difficult. On the other hand, below the lower limit of Condition (13), the proportion of enlargement of the image periphery in a radial direction is extremely increased when image distortion due to distortion of the optical system is corrected by the image processing means. As a result, the degradation of sharpness of the image periphery becomes pronounced.

Also, instead of satisfying Condition (13), it is more desirable that the zoom lens is designed to satisfy one of the following conditions:

$$0.75 < y_{07}/(f_w \cdot \tan \omega_{07w}) < 1.3 \tag{13}'$$

$$0.80 < y_{07}/(f_w \cdot \tan \omega_{07w}) < 1.1 \tag{13}''$$

The upper or lower limit of Condition (13)' may be replaced with the upper or lower limit of Condition (13) or (13)", or the upper or lower limit of Condition (13)" may be replaced with the upper or lower limit of Condition (13) or (13)'.

In accordance with the drawings, Embodiments 1-4 of the present invention will be described below.

In the sectional views of the optical system in the drawings, numerals shown as subscripts of $r_1, r_2, \ldots$ and $d_1, d_2, \ldots$ correspond to face numbers 1, 2, . . . in numerical data. In aberration characteristic diagrams, ΔM in astigmatism diagrams stands for astigmatism in the meridional plane and ΔS stands for astigmatism in the sagittal plane. Also the meridional plane refers to a plane containing the optical axis and the chief ray of the optical system (a plane parallel to the plane of the page) and the sagittal plane refers to a plane perpendicular to the plane containing the optical axis and the chief ray of the optical system (a plane perpendicular to the plane of the page).

In numerical data of lenses in the embodiments described below, R denotes the radius of curvature of each lens surface, D denotes the face-to-face spacing of lenses, Nd denotes the refractive index of each lens at the d line, vd denotes the Abbe's number of each lens at the d line, K denotes a conic constant, and $A_4$, $A_6$, $A_8$, and $A_{10}$ denote aspherical coefficients.

Using the aspherical coefficients of each embodiment, the configuration of an aspherical surface is expressed by the following equation:

$$Z=(Y^2/r)/[1+\{1-(1+K)\cdot(Y/r)^2\}^{1/2}]+A_r Y^4+A_6 Y^6+A_8 Y^8+A_{10} Y^{10}+\ldots$$

where Z is taken as the coordinate in the direction of the optical axis and Y is taken as the coordinate normal to the optical axis.

Embodiment 1

Figure 1B:
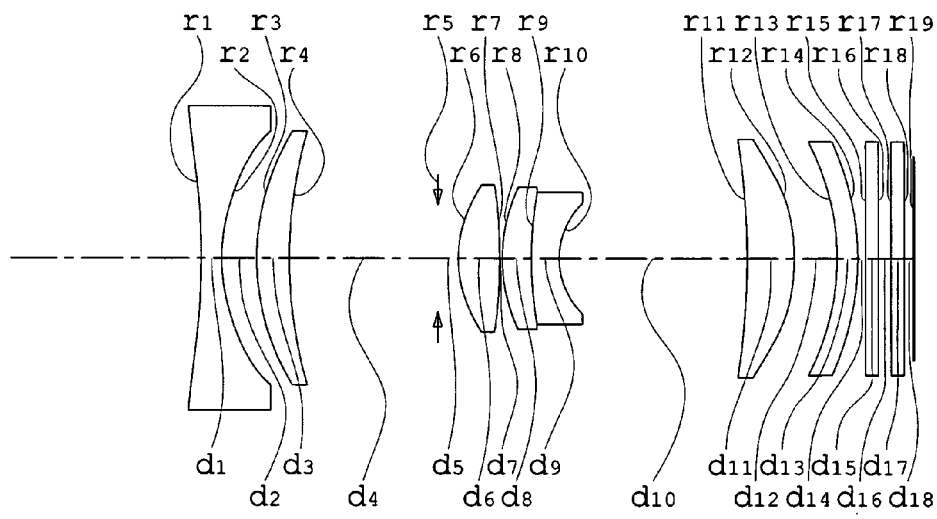
Figure 1C:
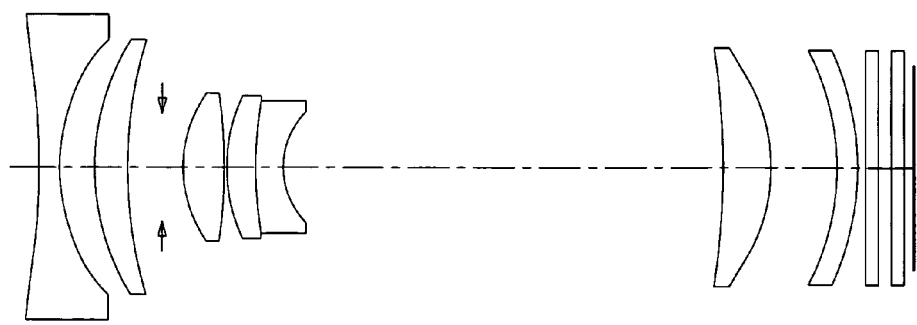

FIGS. 1A, 1B, and 1C show optical arrangements, developed along the optical axis, at wide-angle, middle, and telephoto positions, respectively, in infinite object point focusing of the zoom lens according to Embodiment 1 of the present invention. FIGS. 2A-2D, 2E-2H, and 2I-2L show aberration characteristics at wide-angle, middle, and telephoto positions, respectively, in infinite object point focusing of the zoom lens shown in FIGS. 1A-1C.

First, in accordance with FIGS. 1A, 1B, and 1C, the optical arrangements of the zoom lens of this embodiment will be explained. The zoom lens of the embodiment comprises, in order from the object side along an optical axis Lc, a first lens unit $G_1$ with negative power, a second lens unit $G_2$ with positive power, a third lens unit $G_3$ with positive power, and a fourth lens unit $G_4$. An aperture stop S is interposed between the first lens unit $G_1$ and the second lens unit $G_2$. Also, on the image side of the fourth lens unit $G_4$, a low-pass filter LF, a CCD cover glass CG, and a CCD having an imaging surface IM are arranged in this order from the object side.

The first lens unit $G_1$ consists of, in order from the object side, a first lens element $L_{11}$ with negative power which is a biconcave lens element whose both surfaces are aspherical and a second lens element $L_{12}$ with positive power which is a meniscus lens element with a convex surface facing the object side.

The second lens unit $G_2$ comprises, in order from the object side, a lens element $L_2$, with positive power which is a biconvex lens element whose both surfaces are aspherical and a cemented lens component of a lens element $L_{22}$ with positive power which is a meniscus lens element with a convex surface facing the object side and a lens element $L_{23}$ with negative power which is a meniscus lens element with a convex surface facing the object side.

The third lens unit $G_3$ includes only a lens element $L_3$ with negative power which is a meniscus lens component, molded of resin, with a convex surface facing the image side in which the image-side surface is aspherical.

The fourth lens unit $G_4$ includes only a lens element $L_4$ with a negative power which is a meniscus lens element with a convex surface facing the image side in which the image-side surface is aspherical.

When the magnification is changed in the range from the wide-angle position to the telephoto position, the first lens unit $G_1$ is traversed back and forth along the optical axis Lc in such a way that it is first moved toward the image side and then toward the object side. The second lens unit $G_2$ is moved along the optical axis Lc toward the object side while narrowing spacing between the first lens unit $G_1$ and the second lens $G_2$, together with the aperture stop S. The third lens unit $G_3$ is traversed back and forth along the optical axis Lc in such a way that it is first moved toward the image side and then toward the object side while widening spacing between the second lens unit $G_2$ and the third lens unit $G_3$. Also, in this case, the fourth lens unit is not moved.

Subsequently, configurations and numerical data of lens elements constituting the optical system according to the embodiment are shown below. Also, the unit is millimeters.

| | Surface data | | | |
|---|---|---|---|---|
| Face number | Radius of curvature R | Face spacing D | Refractive index Nd | Abbe's number vd |
| 1 (Aspherical surface) | −18.266 | 0.80 | 1.80495 | 40.90 |
| 2 (Aspherical surface) | 8.644 | 1.37 | | |
| 3 | 9.690 | 1.27 | 1.92286 | 18.90 |
| 4 | 18.017 | D4 | | |
| 5 (Stop) | ∞ | 0.80 | | |
| 6 (Aspherical surface) | 4.835 | 1.60 | 1.58233 | 59.40 |
| 7 (Aspherical surface) | −15.484 | 0.10 | | |
| 8 | 6.661 | 1.12 | 1.78800 | 47.37 |
| 9 | 15.282 | 1.07 | 1.80518 | 25.42 |
| 10 | 3.094 | D10 | | |
| 11 | −31.473 | 1.89 | 1.53113 | 55.80 |
| 12 (Aspherical surface) | −6.040 | D12 | | |
| 13 | −9.992 | 0.80 | 1.53113 | 55.80 |
| 14 (Aspherical surface) | −9.837 | D14 | | |
| 15 | ∞ | 0.50 | 1.51633 | 64.14 |
| 16 | ∞ | 0.50 | | |
| 17 | ∞ | 0.50 | 1.51633 | 64.14 |
| 18 | ∞ | 0.37 | | |
| 19 (Imaging surface) | ∞ | | | |

-continued

Aspherical data

| Face number | Radius of curvature R | Conic constant K | Aspherical coefficients $A_4$ | $A_6$ | $A_8$ | $A_{10}$ |
|---|---|---|---|---|---|---|
| 1 | −18.266 | 0.000 | 6.27173e−04 | −8.77224e−06 | 6.13508e−08 | |
| 2 | 8.644 | 0.991 | 2.94057e−04 | −1.24382e−06 | −1.99268e−07 | −2.62692e−09 |
| 6 | 4.835 | −0.531 | −4.89810e−04 | 8.71213e−06 | −2.15842e−06 | |
| 7 | −15.484 | 0.000 | 5.46267e−04 | 1.85378e−06 | −2.19878e−06 | |
| 12 | −6.040 | 0.000 | 1.38066e−03 | −4.48702e−05 | 1.46604e−06 | |
| 14 | −9.837 | 0.000 | −4.56396e−04 | 1.08446e−04 | −3.42005e−06 | |

Various data
Zoom ratio 3.88

| | Wide-angle | Middle | Telephoto |
|---|---|---|---|
| Focal length | 4.72 | 8.69 | 18.29 |
| F number | 4.65 | 3.73 | 6.05 |
| Field angle | 83.00 | 44.65 | 21.62 |
| Image height | 3.60 | 3.60 | 3.60 |
| Overall lens length | 29.52 | 27.65 | 32.98 |
| Back focus | 1.85 | 1.86 | 1.91 |
| D4 | 12.35 | 6.07 | 1.32 |
| D10 | 2.16 | 7.28 | 17.07 |
| D12 | 2.39 | 1.66 | 1.91 |
| D14 | 0.30 | 0.30 | 0.30 |

Zoom lens unit data

| Unit | Top face number | Focal length |
|---|---|---|
| 1 | 1 | −11.55 |
| 2 | 6 | 8.84 |
| 3 | 11 | 13.73 |
| 4 | 13 | 428.00 |

Data according to Conditions

| | | |
|---|---|---|
| Condition (1) | $0.15 < \phi_{1MF}/\phi_{1MR} < 1.0$ | 0.473 |
| Condition (2) | $-3.0 < \phi_{1PF}/\phi_{1PR} < -1.0$ | −1.859 |
| Condition (3) | $15 < (\phi 3/\phi 4) < 320$ | 31.172608 |
| Condition (4) | $-10 < (R_{3r} + R_{4f})/(R_{3r} - R_{4f}) < 0$ | −4.057395 |
| Condition (5) | $1 < ds/dt < 1.5$ | 1.1435555 |
| Condition (6) | $6 \leq N \leq 9$ | 7 |
| Condition (7) | $n_{2pave} \geq 1.59$ | 1.685 |
| Condition (8) | $v_{2n} \leq 35$ | 53.385 |
| Condition (9) | $n_{3ave} \geq 1.48$ | 1.531 |
| Condition (10) | $v_{3ave} \geq 60$ | 55.8 |
| Condition (11) | $n_4 \geq 1.48$ | 1.531 |
| Condition (12) | $v_4 \geq 60$ | 55.8 |
| Condition (13) | $0.7 < y_{07}/(f_w \cdot \tan \omega_{07w}) < 1.5$ | 0.920 |

Embodiment 2

Figure 3A:
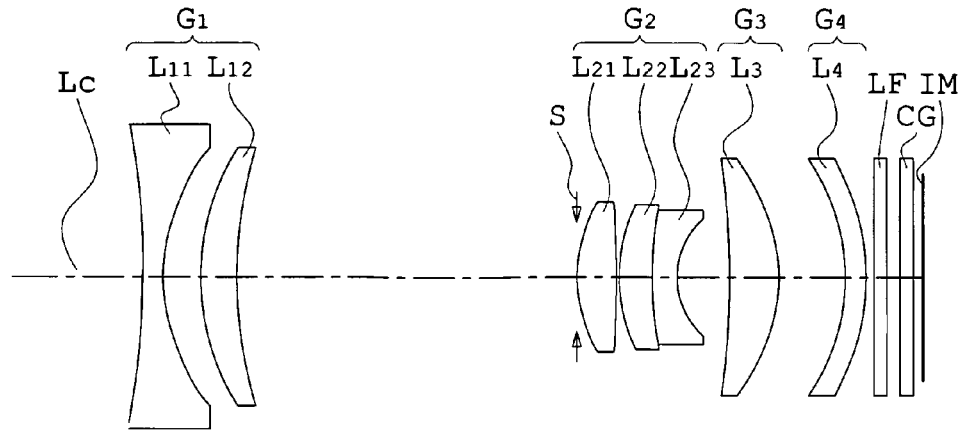
FIGS. 3A, 3B, and 3C are sectional views showing optical arrangements, developed along the optical axis, at wide-angle, middle, and telephoto positions, respectively, in infinite object point focusing of the zoom lens according to Embodiment 2 of the present invention.
Figure 3B:
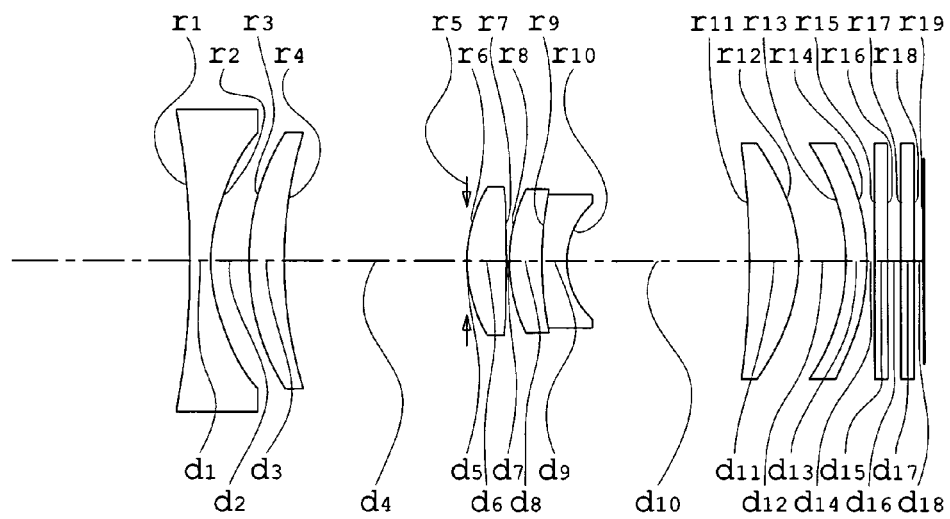
Figure 3C:
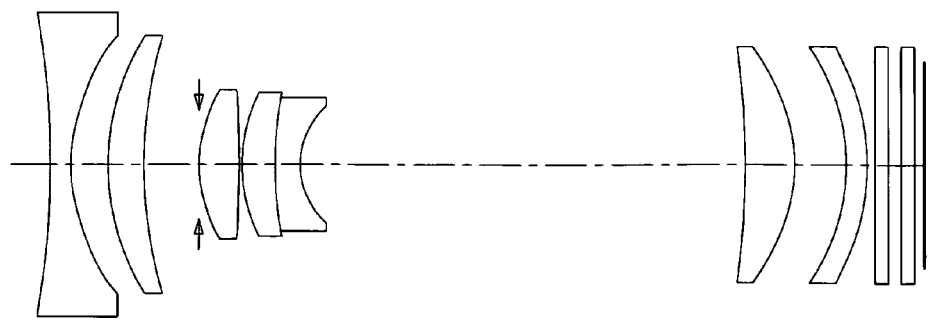

FIGS. 3A, 3B, and 3C show optical arrangements, developed along the optical axis, at wide-angle, middle, and telephoto positions, respectively, in infinite object point focusing of the zoom lens according to Embodiment 2 of the present invention. FIGS. 4A-4D, 4E-4H, and 4I-4L show aberration characteristics at wide-angle, middle, and telephoto positions, respectively, in infinite object point focusing of the zoom lens shown in FIGS. 3A-3C.

First, in accordance with FIGS. 3A, 3B, and 3C, the optical arrangements of the zoom lens of this embodiment will be explained. The zoom lens of the embodiment comprises, in order from the object side along the optical axis Lc, the first lens unit $G_1$ with negative power, the second lens unit $G_2$ with positive power, the third lens unit $G_3$ with positive power, and the fourth lens unit $G_4$. The aperture stop S is interposed between the first lens unit $G_1$ and the second lens unit $G_2$. Also, on the image side of the fourth lens unit $G_4$, the plane-parallel plate-like low-pass filter LF, the plane-parallel plate-like CCD cover glass CQ and the CCD having the imaging surface IM are arranged in this order from the object side.

The first lens unit $G_1$ consists of, in order from the object side, the first lens element $L_{11}$ with negative power which is the biconcave lens element whose both surfaces are aspherical and the second lens element $L_{12}$ with positive power which is the meniscus lens element with the convex surface facing the object side.

The second lens unit $G_2$ comprises, in order from the object side, the lens element $L_{21}$ with positive power which is the biconvex lens element whose both surfaces are aspherical and the cemented lens component of the lens element $L_{22}$ with positive power which is the meniscus lens element with the convex surface facing the object side and the lens element $L_{23}$ with negative power which is the meniscus lens element with the convex surface facing the object side.

The third lens unit $G_3$ includes only the lens element $L_3$ with negative power which is the meniscus lens component, molded of resin, with the convex surface facing the image side in which the image-side surface is aspherical.

The fourth lens unit $G_4$ includes only the lens element $L_4$ with a negative power which is the meniscus lens element with the convex surface facing the image side in which the image-side surface is aspherical.

When the magnification is changed in the range from the wide-angle position to the telephoto position, the first lens unit $G_1$ is traversed back and forth along the optical axis Lc in such a way that it is first moved toward the image side and then toward the object side. The second lens unit $G_2$ is moved along the optical axis Lc toward the object side while narrowing spacing between the first lens unit $G_1$ and the second lens $G_2$, together with the aperture stop S. The third lens unit $G_3$ is traversed back and forth along the optical axis Lc in such a way that it is first moved toward the image side and then toward the object side while widening spacing between the second lens unit $G_2$ and the third lens unit $G_3$. Also, in this case, the fourth lens unit is not moved.

Subsequently, configurations and numerical data of lens elements constituting the optical system according to the embodiment are shown below. Also, the unit is millimeters.

Surface data

| Face number | Radius of curvature R | Face spacing D | Refractive index Nd | Abbe's number vd |
|---|---|---|---|---|
| 1 (Aspherical surface) | −20.071 | 0.80 | 1.80495 | 40.90 |
| 2 (Aspherical surface) | 8.468 | 1.44 | | |
| 3 | 9.629 | 1.36 | 1.92286 | 18.90 |
| 4 | 17.446 | D4 | | |
| 5 (Stop) | ∞ | 0.00 | | |
| 6 (Aspherical surface) | 4.896 | 1.53 | 1.58233 | 59.40 |
| 7 (Aspherical surface) | −17.427 | 0.10 | | |
| 8 | 6.420 | 1.26 | 1.78800 | 47.37 |
| 9 | 14.974 | 0.96 | 1.80518 | 25.42 |
| 10 | 3.092 | D10 | | |
| 11 | −34.250 | 1.89 | 1.53113 | 55.80 |
| 12 (Aspherical surface) | −6.163 | D12 | | |
| 13 | −8.132 | 0.80 | 1.52542 | 55.78 |
| 14 (Aspherical surface) | −8.082 | D14 | | |
| 15 | ∞ | 0.50 | 1.51633 | 64.14 |
| 16 | ∞ | 0.50 | | |
| 17 | ∞ | 0.50 | 1.51633 | 64.14 |
| 18 | ∞ | 0.37 | | |
| 19 (Imaging surface) | ∞ | | | |

Aspherical data

| Face number | Radius of curvature R | Conic constant K | $A_4$ | $A_6$ | $A_8$ | $A_{10}$ |
|---|---|---|---|---|---|---|
| 1 | −20.071 | 0.000 | 5.44046e−04 | −5.33453e−06 | 1.41179e−08 | |
| 2 | 8.468 | 0.769 | 2.69602e−04 | −3.19445e−06 | 2.88056e−07 | −1.37906e−08 |
| 6 | 4.896 | −0.274 | −5.60755e−04 | −5.91754e−06 | 3.57413e−06 | |
| 7 | −17.427 | 0.000 | 6.46385e−04 | 1.43732e−06 | 3.83621e−06 | |
| 12 | −6.163 | 0.000 | 1.42015e−03 | −5.14081e−05 | 1.54981e−06 | |
| 14 | −8.082 | 0.000 | −8.92351e−04 | 1.35650e−04 | −3.80333e−06 | |

Various data
Zoom ratio 3.87

| | Wide-angle | Middle | Telephoto |
|---|---|---|---|
| Focal length | 4.77 | 8.57 | 18.44 |
| F number | 2.61 | 3.66 | 6.07 |
| Field angle | 81.79 | 45.38 | 21.47 |
| Image height | 3.60 | 3.60 | 3.60 |
| Overall lens length | 29.67 | 27.88 | 33.23 |
| Back focus | 1.85 | 1.87 | 1.89 |
| D4 | 13.12 | 7.05 | 2.11 |
| D10 | 2.00 | 6.99 | 17.10 |
| D12 | 2.55 | 1.82 | 1.98 |
| D14 | 0.30 | 0.30 | 0.30 |

Zoom lens unit data

| Unit | Top face number | Focal length |
|---|---|---|
| 1 | 1 | −11.70 |
| 2 | 6 | 8.94 |
| 3 | 11 | 13.83 |
| 4 | 13 | 384.02 |

Data according to Conditions

| | | |
|---|---|---|
| Condition (1) | $0.15 < \phi_{1MF}/\phi_{1MR} < 1.0$ | 0.421 |
| Condition (2) | $-3.0 < \phi_{1PF}/\phi_{1PR} < -1.0$ | −1.792 |

-continued

| | | |
|---|---|---|
| Condition (3) | $15 < (\phi 3/\phi 4) < 320$ | 27.776077 |
| Condition (4) | $-10 < (R_{3r} + R_{4f})/(R_{3r} - R_{4f}) < 0$ | -7.257263 |
| Condition (5) | $1 < ds/dt < 1.5$ | 1.0589041 |
| Condition (6) | $6 \leq N \leq 9$ | 7 |
| Condition (7) | $n_{2pave} \geq 1.59$ | 1.685 |
| Condition (8) | $v_{2n} \leq 35$ | 53.385 |
| Condition (9) | $n_{3ave} \geq 1.48$ | 1.531 |
| Condition (10) | $v_{3ave} \geq 60$ | 55.8 |
| Condition (11) | $n_4 \geq 1.48$ | 1.525 |
| Condition (12) | $v_4 \geq 60$ | 55.78 |
| Condition (13) | $0.7 < y_{07}/(f_w \cdot \tan \omega_{07w}) < 1.5$ | 0.921 |

Embodiment 3

Figure 5A:
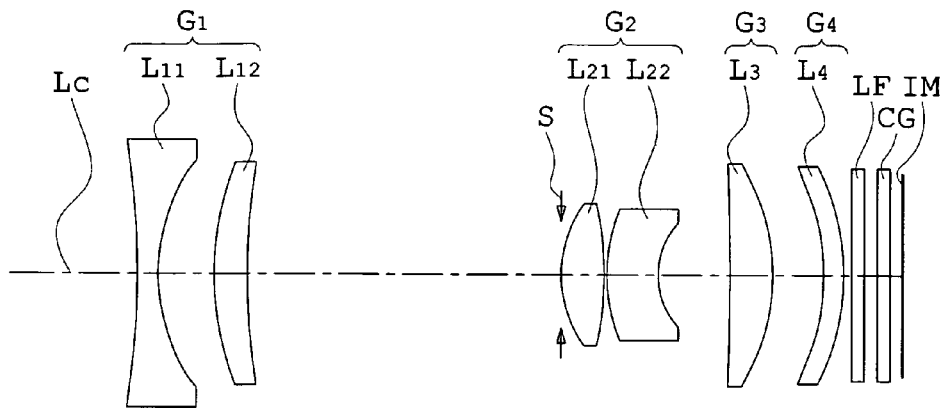
FIGS. 5A, 5B, and 5C are sectional views showing optical arrangements, developed along the optical axis, at wide-angle, middle, and telephoto positions, respectively, in infinite object point focusing of the zoom lens according to Embodiment 3 of the present invention.
Figure 5B:
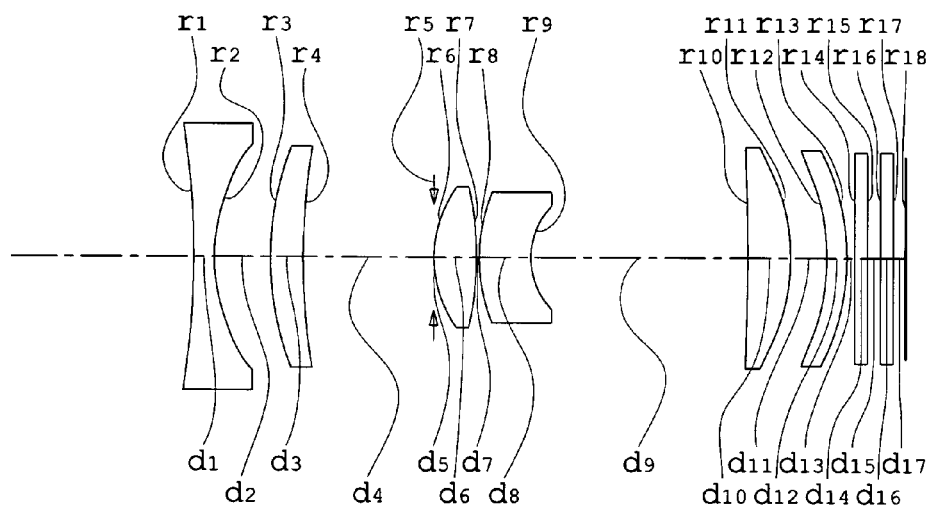
Figure 5C:
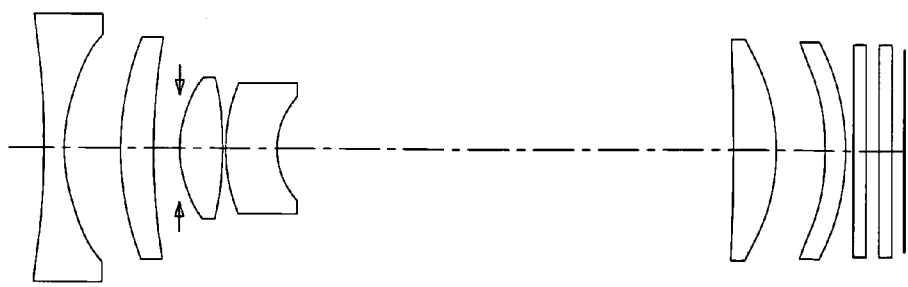

FIGS. 5A, 5B, and 5C show optical arrangements, developed along the optical axis, at wide-angle, middle, and telephoto positions, respectively, in infinite object point focusing of the zoom lens according to Embodiment 3 of the present invention. FIGS. 6A-6D, 6E-6H, and 6I-6L show aberration characteristics at wide-angle, middle, and telephoto positions, respectively, in infinite object point focusing of the zoom lens shown in FIGS. 5A-5C.

First, in accordance with FIGS. 5A, 5B, and 5C, the optical arrangements of the zoom lens of this embodiment will be explained. The zoom lens of the embodiment comprises, in order from the object side along the optical axis Lc, the first lens unit $G_1$ with negative power, the second lens unit $G_2$ with positive power, the third lens unit $G_3$ with positive power, and the fourth lens unit $G_4$. The aperture stop S is interposed between the first lens unit $G_1$ and the second lens unit $G_2$. Also, on the image side of the fourth lens unit $G_4$, the plane-parallel plate-like low-pass filter LF, the plane-parallel plate-like CCD cover glass CG, and the CCD having the imaging surface IM are arranged in this order from the object side.

The first lens unit $G_1$ consists of, in order from the object side, the first lens element $L_{11}$ with negative power which is the biconcave lens element whose both surfaces are aspherical and the second lens element $L_{12}$ with positive power which is the meniscus lens element with the convex surface facing the object side.

The second lens unit $G_2$ comprises, in order from the object side, the lens element $L_{21}$ with positive power which is the biconvex lens element whose both surfaces are aspherical and the lens element $L_{22}$ with negative power which is the meniscus lens element with the convex surface facing the object side.

The third lens unit $G_3$ includes only the lens element $L_3$ with negative power which is the meniscus lens component, molded of resin, with the convex surface facing the image side in which the image-side surface is aspherical.

The fourth lens unit $G_4$ includes only the lens element $L_4$ with a negative power which is a meniscus lens element with a convex surface facing the image side in which the object-side surface is aspherical.

When the magnification is changed in the range from the wide-angle position to the telephoto position, the first lens unit $G_1$ is traversed back and forth along the optical axis Lc in such a way that it is first moved toward the image side and then toward the object side. The second lens unit $G_2$ is moved along the optical axis Lc toward the object side while narrowing spacing between the first lens unit $G_1$ and the second lens $G_2$, together with the aperture stop S. The third lens unit $G_3$ is traversed back and forth along the optical axis Lc in such a way that it is first moved toward the image side and then toward the object side while widening spacing between the second lens unit $G_2$ and the third lens unit $G_3$. Also, in this case, the fourth lens unit is not moved.

Subsequently, configurations and numerical data of lens elements constituting the optical system according to the embodiment are shown below. Also, the unit is millimeters.

| | Surface data | | | |
|---|---|---|---|---|
| Face number | Radius of curvature R | Face spacing D | Refractive index Nd | Abbe's number vd |
| 1 (Aspherical surface) | -19.567 | 0.80 | 1.80495 | 40.90 |
| 2 (Aspherical surface) | 8.000 | 2.19 | | |
| 3 | 12.182 | 1.29 | 1.92286 | 18.90 |
| 4 | 27.565 | D4 | | |
| 5 (Stop) | ∞ | 0.00 | | |
| 6 (Aspherical surface) | 4.526 | 1.69 | 1.58233 | 59.40 |
| 7 (Aspherical surface) | -13.187 | 0.10 | | |
| 8 | 6.856 | 2.01 | 1.94595 | 17.98 |
| 9 | 3.056 | D9 | | |
| 10 | -107.403 | 1.66 | 1.53113 | 55.80 |
| 11 (Aspherical surface) | -6.945 | D11 | | |
| 12 (Aspherical surface) | -10.000 | 0.80 | 1.52542 | 55.78 |
| 13 | -9.543 | D13 | | |
| 14 | ∞ | 0.50 | 1.51633 | 64.14 |
| 15 | ∞ | 0.50 | | |
| 16 | ∞ | 0.50 | 1.51633 | 64.14 |
| 17 | ∞ | 0.50 | | |
| 18 (Imaging surface) | ∞ | | | |

-continued

Aspherical data

| Face number | Radius of curvature R | Conic constant K | Aspherical coefficients $A_4$ | $A_6$ | $A_8$ | $A_{10}$ |
|---|---|---|---|---|---|---|
| 1 | −19.567 | 0.000 | 5.62061e−04 | −1.00515e−05 | 1.16591e−07 | |
| 2 | 8.000 | 1.377 | −7.67201e−05 | −7.71670e−06 | −2.51189e−07 | −1.70497e−08 |
| 6 | 4.526 | −2.585 | 1.78371e−03 | −2.61312e−06 | −9.35148e−06 | |
| 7 | −13.187 | 0.000 | 2.94482e−04 | 7.50654e−05 | −1.41852e−05 | |
| 11 | −6.945 | 0.000 | 9.49811e−04 | −3.25098e−05 | 1.17945e−06 | |
| 12 | −10.000 | 0.000 | −2.12060e−04 | −4.25320e−05 | 2.06801e−06 | 1.36129e−08 |

Various data
Zoom ratio 3.88

| | Wide-angle | Middle | Telephoto |
|---|---|---|---|
| Focal length | 4.71 | 9.33 | 18.28 |
| F number | 2.63 | 3.90 | 6.12 |
| Field angle | 82.60 | 41.87 | 21.82 |
| Image height | 3.60 | 3.60 | 3.60 |
| Overall lens length | 29.47 | 27.55 | 33.29 |
| Back focus | 1.96 | 1.96 | 1.96 |
| D4 | 12.18 | 5.16 | 1.00 |
| D9 | 2.82 | 8.49 | 17.89 |
| D11 | 1.97 | 1.40 | 1.90 |
| D13 | 0.30 | 0.30 | 0.30 |

Zoom lens unit data

| Unit | Top face number | Focal length |
|---|---|---|
| 1 | 1 | −11.34 |
| 2 | 6 | 8.89 |
| 3 | 10 | 13.90 |
| 4 | 12 | 247.91 |

Data according to Conditions

| | | |
|---|---|---|
| Condition (1) | $0.15 < \phi_{1MF}/\phi_{1MR} < 1.0$ | 0.411 |
| Condition (2) | $-3.0 < \phi_{1PF}/\phi_{1PR} < -1.0$ | −2.262 |
| Condition (3) | $15 < (\phi 3/\phi 4) < 320$ | 17.834033 |
| Condition (4) | $-10 < (R_{3r} + R_{4f})/(R_{3r} - R_{4f}) < 0$ | −5.547386 |
| Condition (5) | $1 < ds/dt < 1.5$ | 1.0752665 |
| Condition (6) | $6 \leq N \leq 9$ | 6 |
| Condition (7) | $n_{2pave} \geq 1.59$ | 1.582 |
| Condition (8) | $v_{2n} \leq 35$ | 59.4 |
| Condition (9) | $n_{3ave} \geq 1.48$ | 1.531 |
| Condition (10) | $v_{3ave} \geq 60$ | 55.8 |
| Condition (11) | $n_4 \geq 1.48$ | 1.525 |
| Condition (12) | $v_4 \geq 60$ | 55.78 |
| Condition (13) | $0.7 < y_{07}/(f_w \cdot \tan\omega_{07w}) < 1.5$ | 0.932 |

Embodiment 4

Figure 7A:
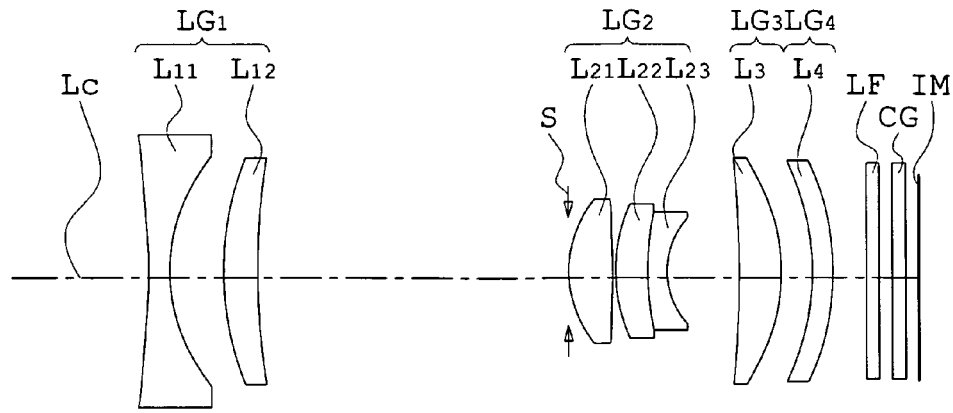
FIGS. 7A, 7B, and 7C are sectional views showing optical arrangements, developed along the optical axis, at wide-angle, middle, and telephoto positions, respectively, in infinite object point focusing of the zoom lens according to Embodiment 4 of the present invention.
Figure 7B:
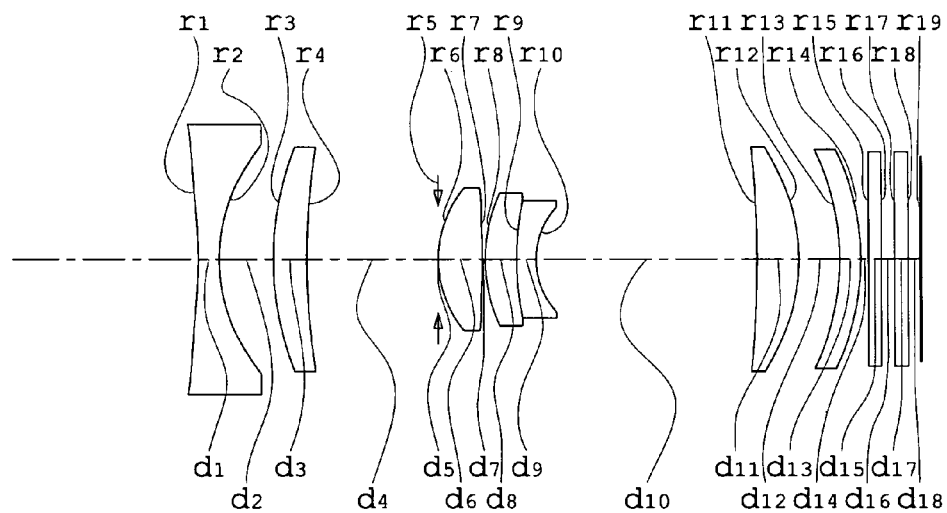
Figure 7C:
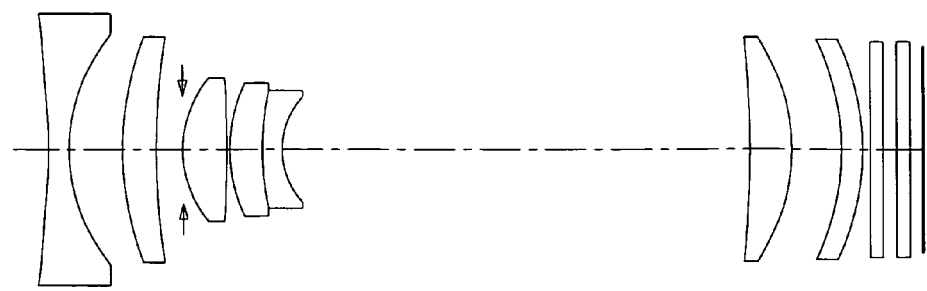

FIGS. 7A, 7B, and 7C show optical arrangements, developed along the optical axis, at wide-angle, middle, and telephoto positions, respectively, in infinite object point focusing of the zoom lens according to Embodiment 4 of the present invention. FIGS. 8A-8D, 8E-8H, and 8I-8L show aberration characteristics at wide-angle, middle, and telephoto positions, respectively, in infinite object point focusing of the zoom lens shown in FIGS. 7A-7C.

First, in accordance with FIGS. 7A, 7B, and 7C, the optical arrangements of the zoom lens of this embodiment will be explained. The zoom lens of the embodiment comprises, in order from the object side along the optical axis Lc, the first lens unit $G_1$ with negative power, the second lens unit $G_2$ with positive power, the third lens unit $G_3$ with positive power, and the fourth lens unit $G_4$. The aperture stop S is interposed between the first lens unit $G_1$ and the second lens unit $G_2$. Also, on the image side of the fourth lens unit $G_4$, the plane-parallel plate-like low-pass filter LF, the plane-parallel plate-like CCD cover glass CG, and the CCD having the imaging surface IM are arranged in this order from the object side.

The first lens unit $G_1$ consists of, in order from the object side, the first lens element $L_{11}$ with negative power which is the biconcave lens element whose both surfaces are aspherical and the second lens element $L_{12}$ with positive power which is the meniscus lens element with the convex surface facing the object side.

The second lens unit $G_2$ comprises, in order from the object side, the lens element $L_{21}$ with positive power which is the biconvex lens element whose both surfaces are aspherical and the cemented lens component of the lens element $L_{22}$ with positive power which is the meniscus lens element with the convex surface facing the object side and the lens element $L_{23}$ with negative power which is the meniscus lens element with the convex surface facing the object side.

The third lens unit $G_3$ includes only the lens element $L_3$ with negative power which is the meniscus lens component, molded of resin, with the convex surface facing the image side in which the image-side surface is aspherical.

The fourth lens unit $G_4$ includes only the lens element $L_4$ with a positive power which is a meniscus lens element with a convex surface facing the image side.

When the magnification is changed in the range from the wide-angle position to the telephoto position, the first lens unit $G_1$ is traversed back and forth along the optical axis Lc in such a way that it is first moved toward the image side and then toward the object side. The second lens unit $G_2$ is moved along the optical axis Lc toward the object side while narrowing spacing between the first lens unit $G_1$ and the second lens $G_2$, together with the aperture stop S. The third lens unit $G_3$ is traversed back and forth along the optical axis Lc in such a way that it is first moved toward the image side and then toward the object side while widening spacing between the second lens unit $G_2$ and the third lens unit $G_3$. The fourth lens unit is moved toward the image side while widening spacing between the third lens unit $G_3$ and the fourth lens unit $G_4$ only when the magnification is changed in the range from the wide-angle position to the middle position.

Subsequently, configurations and numerical data of lens elements constituting the optical system according to the embodiment are shown below. Also, the unit is millimeters.

Surface data

| Face number | Radius of curvature R | Face spacing D | Refractive index Nd | Abbe's number vd |
|---|---|---|---|---|
| 1 (Aspherical surface) | −18.382 | 0.80 | 1.80495 | 40.90 |
| 2 (Aspherical surface) | 8.000 | 2.06 | | |
| 3 | 12.082 | 1.30 | 1.92286 | 18.90 |
| 4 | 28.964 | D4 | | |
| 5 (Stop) | ∞ | 0.00 | | |
| 6 (Aspherical surface) | 4.600 | 1.71 | 1.58233 | 59.40 |
| 7 (Aspherical surface) | −18.823 | 0.10 | | |
| 8 | 6.209 | 1.24 | 1.81600 | 46.62 |
| 9 | 11.409 | 0.75 | 1.84666 | 23.78 |
| 10 | 3.060 | D10 | | |
| 11 | −44.690 | 1.60 | 1.55402 | 60.71 |
| 12 (Aspherical surface) | −6.539 | D12 | | |
| 13 | −10.000 | 0.80 | 1.52542 | 55.78 |
| 14 | −10.230 | D14 | | |
| 15 | ∞ | 0.50 | 1.51633 | 64.14 |
| 16 | ∞ | 0.50 | | |
| 17 | ∞ | 0.50 | 1.51633 | 64.14 |
| 18 | ∞ | 0.50 | | |
| 19 (Imaging surface) | ∞ | | | |

Aspherical data

| Face number | Radius of curvature R | Conic constant K | $A_4$ | $A_6$ | $A_8$ | $A_{10}$ |
|---|---|---|---|---|---|---|
| 1 | −18.382 | 0.000 | 6.00929e−04 | −7.12017e−06 | 3.76422e−08 | |
| 2 | 8.000 | 1.188 | 1.61098e−05 | −6.02778e−06 | 1.59902e−07 | −2.52743e−08 |
| 6 | 4.600 | −2.062 | 2.11507e−03 | −6.05020e−05 | 2.05939e−05 | |
| 7 | −18.823 | 0.000 | 1.34109e−03 | −3.83688e−05 | 2.47046e−05 | |
| 12 | −6.539 | 0.000 | 1.08021e−03 | −1.48062e−05 | 4.34895e−07 | |

Various data
Zoom ratio 3.88

| | Wide-angle | Middle | Telephoto |
|---|---|---|---|
| Focal length | 4.71 | 9.33 | 18.27 |
| F number | 2.62 | 3.87 | 6.09 |
| Field angle | 82.60 | 42.08 | 21.87 |
| Image height | 3.60 | 3.60 | 3.60 |
| Overall lens length | 29.35 | 27.50 | 33.29 |
| Back focus | 2.94 | 1.96 | 1.95 |
| D4 | 12.05 | 5.08 | 1.00 |
| D10 | 2.79 | 8.53 | 18.07 |
| D12 | 1.20 | 1.57 | 1.90 |
| D14 | 1.28 | 0.30 | 0.30 |

Zoom lens unit data

| Unit | Top face number | Focal length |
|---|---|---|
| 1 | 1 | −11.30 |
| 2 | 6 | 8.94 |
| 3 | 11 | 13.62 |
| 4 | 13 | 4266.54 |

-continued

Data according to Conditions

| Condition (1) | $0.15 < \phi_{1MF}/\phi_{1MR} < 1.0$ | 0.435 |
|---|---|---|
| Condition (2) | $-3.0 < \phi_{1PF}/\phi_{1PR} < -1.0$ | −2.397 |
| Condition (3) | $15 < (\phi 3/\phi 4) < 320$ | 313.20683 |
| Condition (4) | $-10 < (R_{3r} + R_{4f})/(R_{3r} - R_{4f}) < 0$ | −4.778565 |
| Condition (5) | $1 < ds/dt < 1.5$ | 1.206884 |
| Condition (6) | $6 \leq N \leq 9$ | 7 |
| Condition (7) | $n_{2pave} \geq 1.59$ | 1.699 |
| Condition (8) | $\nu_{2n} \leq 35$ | 53.01 |
| Condition (9) | $n_{3ave} \geq 1.48$ | 1.554 |
| Condition (10) | $\nu_{3ave} \geq 60$ | 60.71 |
| Condition (11) | $n_4 \geq 1.48$ | 1.525 |
| Condition (12) | $\nu_4 \geq 60$ | 55.78 |
| Condition (13) | $0.7 < y_{07}/(f_w \cdot \tan \omega_{07w}) < 1.5$ | 0.930 |

Also, in each embodiment mentioned above, the aperture stop S is placed on the image side of the second lens unit, but, for example, it may be interposed between the lens elements constituting the second lens unit on condition that it is moved integrally with the second lens unit. Although in each embodiment the zoom lens is constructed with four lens units, the present invention is not limited to this construction and an additional lens unit may be placed on the image side of the fourth lens unit.

The zoom lens of the present invention may be constructed as described below.

The zoom lens of the present invention may be designed to place a flare stop in addition to the aperture stop in order to cut off unwanted light such as ghost and flare. Also, the flare stop may be located at any of positions on the object side of the first lens unit, between the first lens unit and the second lens unit, between the second lens unit and the third lens unit, between the third lens unit and the fourth lens unit, and between the fourth lens unit and the imaging surface. The flare stop may be constructed with a frame member or with another member. In addition, the flare stop may be constructed in such a way that it is printed directly on an optical member or that paint or an adhesive seal is used. The flare stop may have any of shapes of a circle, ellipse, rectangle, polygon, and contour surrounded by a function curve. The flare stop may be designed to cut off not only detrimental light beams, but also light beams such as coma flare on an image periphery.

In the zoom lens of the present invention, an antireflection coat may be applied to each lens element so that ghost and/or flare is lessened. In this case, in order to lessen the ghost and/or flare more effectively, it is desirable that the antireflection coat to be applied is used as a multiple coat. An infrared cutoff coat may be applied not to the low-pass filter, but to the lens surface of each lens element or the cover glass.

Also, in order to prevent ghost and/or flare from occurring, it is generally performed that the antireflection coat is applied to the air contact surface of a lens element. On the other hand, the refractive index of an adhesive on the cemented surface of a cemented lens component is much higher than that of air. Hence, the cemented surface of the cemented lens component often has the refractive index originally equal to or less than a single layer coat, and thus the coat is not particularly applied in most cases. However, when the anti-reflection coat is positively applied to the cemented surface of the cemented lens component, ghost and/or flare can be further lessened and a more favorable image can be obtained.

In particular, high-index glass materials in which the effect of correction for aberration is high have been popularized in recent years and have come to be often used in optical systems for cameras. However, when the high-index glass material is used for the cemented lens component, reflection at the cemented surface ceases to be negligible. In this case, the application of the antireflection coat to the cemented surface is particularly effective.

Such effective use of the coat of the contact surface is disclosed in each of Japanese Patent Kokai Nos. Hei 2-27301, 2001-324676, and 2005-92115 and U.S. Pat. No. 7,116,482. For the application of the coat, it is only necessary that a relatively high-index coating substance, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a relatively low-index coating substance, such as $MgF_2$, $SiO_2$, or $Al_2O_3$, is properly selected in accordance with the refractive index of a lens for a substrate and the refractive index of the adhesive and is set to a film thickness such as to satisfy a phase condition.

As a matter of course, the coat of the cemented surface, like the coating on the air contact surface of the lens element, may be used as a multicoat. The coat substance of the number of films of two or more layers is properly combined with the film thickness and thereby a further reduction in reflectance and the control of the spectral characteristic and/or the angular characteristic of the reflectance become possible. As for each of the lens contact surfaces excluding the first lens unit, it is needless to say that the coat of the cemented surface according to the same idea is effective.

In the case of the zoom lens of the present invention, it is desirable that focusing for making a focus adjustment is performed by the third lens unit. However, the focusing may be performed by one of the first, second, and fourth lens units or by a plurality of lens units. In addition, the focusing may be performed by moving the entire zoom lens or a part of the zoom lens.

In the zoom lens of the present invention, a reduction in brightness on the periphery of the image may be moderated by shifting the microlens array of the CCD. For example, the design of the microlens array of the CCD may be changed in accordance with the angle of incidence of a light ray at the image height. The amount of reduction in brightness on the periphery of the image may be corrected by image processing.

The zoom lens according to the present invention discussed above can be used in a photographic apparatus in which photography is performed by forming an object image obtained through the zoom lens on the image sensor such as the CCD, notably in a digital camera or video camera. A specific example of this apparatus is mentioned below.

Figure 9:
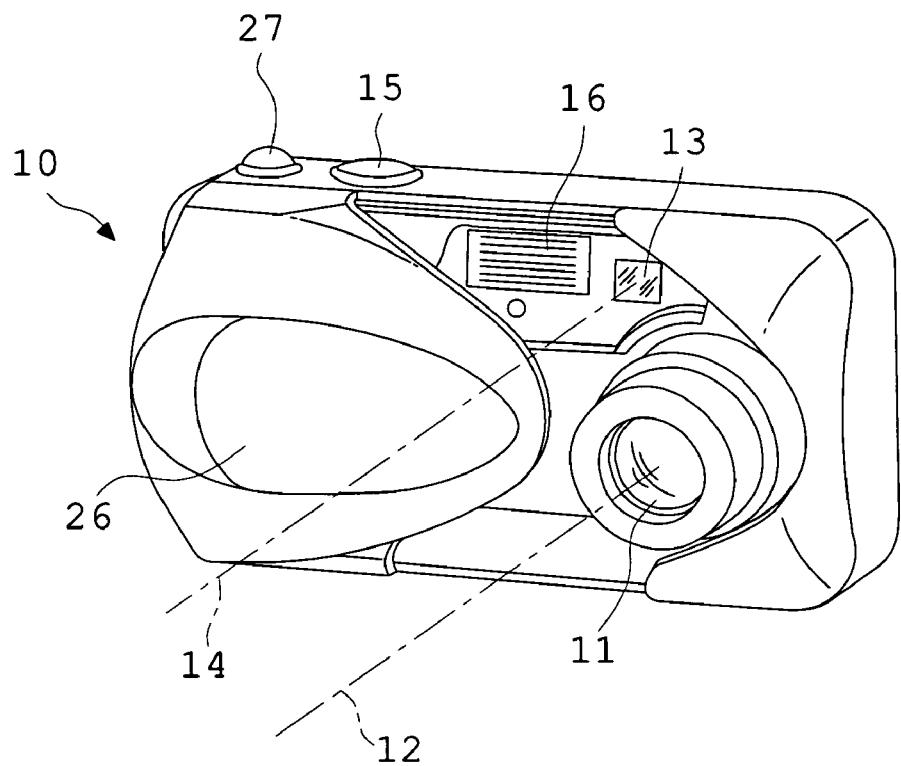
FIG. 9 is a front perspective view showing the appearance of a digital camera incorporating the zoom lens of the present invention.
Figure 10:
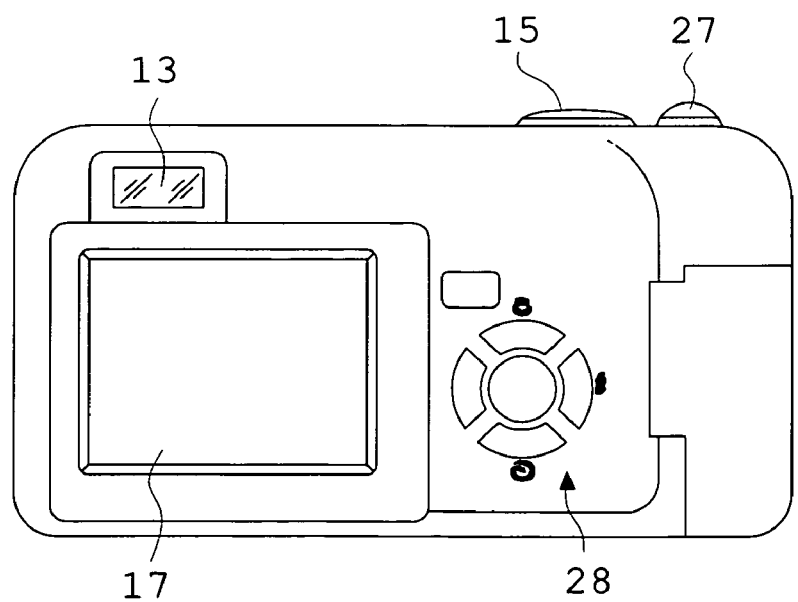
FIG. 10 is a back front view showing the digital camera of FIG. 9.
Figure 11:
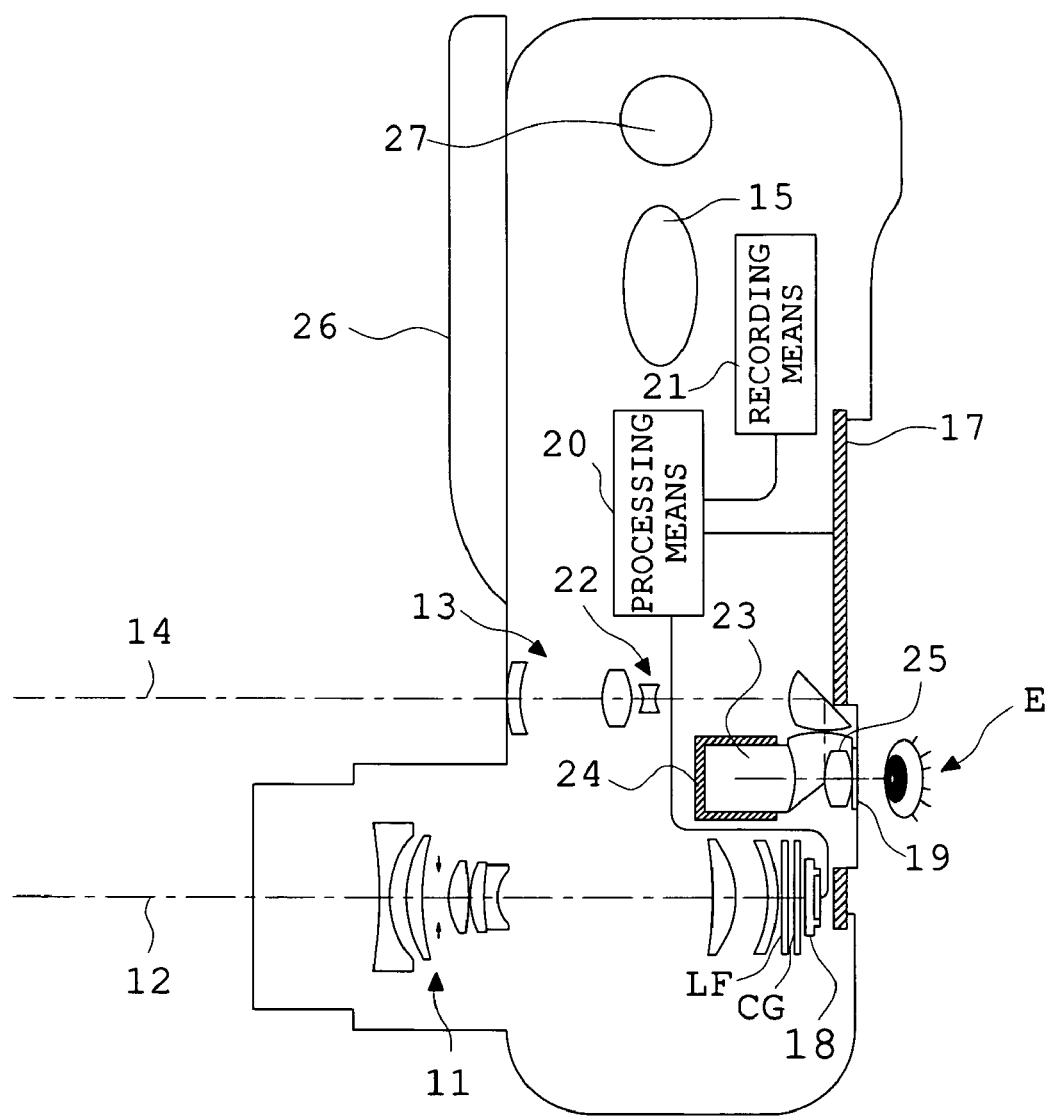
FIG. 11 is a perspective plan view showing schematically the structure of the digital camera of FIG. 9.

FIGS. 9, 10, and 11 show the construction of the digital camera using the present invention. FIG. 9 shows the appearance of the digital camera, FIG. 10 shows the back of the digital camera, and FIG. 11 shows the structure of the digital camera. However, in FIGS. 9 and 11, the zoom lens where the lens barrel is not collapsed is shown.

A digital camera 10 includes a zoom lens 11 placed on a photographing optical path 12, a finder optical system 13 placed on a finder optical path 14, a shutter button 15, a flash light emitting section 6, a liquid crystal display monitor 17, a focal length changing button 27, and a setting changing switch 28. The digital camera 10 is constructed so that when the lens barrel of the zoom lens 11 is collapsed, a cover 26 is slid to shade the zoom lens 11 and the finder optical system 13.

When the cover 26 is opened and the digital camera 10 is set to a photographic state, the zoom lens 11 is in a state where the lens barrel is not collapsed as shown in FIG. 9. In this state, when the shutter button 15 provided on the upper portion of the digital camera 10 is pushed, photography is performed through the zoom lens 11, for example, the zoom lens described in Embodiment 1 of the present invention, in association with the shutter button 15. The object image is formed on the imaging surface of a CCD 18 that is a solid-state image sensor, through the zoom lens 11, the low-pass filter LF, and the cover glass CG. The image information of the object image formed on the imaging surface of the CCD 18 is recorded in a recording means 21 through a processing means 20. The image information thus recorded is fetched by the processing means 20 and can also be displayed, as an electronic image, on the liquid crystal display monitor 17 provide on the back surface of the camera.

In addition, on the finder optical path 14, a finder objective optical system 22 is placed. The finder objective optical system 22 includes a plurality of lens units (three lens units in the case of FIG. 11) and two prisms so that the focal length is changed in association with the zoom lens 11. In the finder objective optical system 22, the object image is formed on a field frame 24 of an erecting prism 23 that is an image erecting member. Behind the erecting prism 23, an eyepiece optical system 25 is placed to introduce an erected image into an eye ball E of an observer. Also, a cover member 19 is placed on the exit side of the eyepiece optical system 25.

In the digital camera 10 constructed as mentioned above, favorable performance is secured and the compact design of the digital camera 10 can be realized because the zoom lens 11 has a high variable magnification ratio, is small in size, and can be incorporated by collapsing the lens barrel.

What is claimed is:

1. A zoom lens comprising, in order from an object side:
a first lens unit with negative power;
a second lens unit with positive power;
a third lens unit with positive power; and
a fourth lens unit,
wherein when a magnification of the zoom lens is changed in a range from a wide-angle position to a telephoto position, spacing between the first lens unit and the second lens unit is narrowed and spacing between the second lens unit and the third lens unit is widened; an aperture stop moved integrally with the second lens unit is interposed between a most image-side lens element of the first lens unit and a most image-side lens element of the second lens unit; and the first lens unit consists of a first lens element with negative power placed on the object side and a second lens element with positive power placed on an image side and satisfies the following conditions:

$0.15 < \phi_{1MF}/\phi_{1MR} < 1.0$ $-3.0 < \phi_{1PF}/\phi_{1PR} < -1.0$ where $\phi_{1MF}$ is a power of an object-side surface of the first lens element with negative power of the first lens unit, $\phi_{1MR}$ is a power of an image-side surface of the first lens element with negative power of the first lens unit, $\phi_{1PF}$ is a power of an object-side surface of the second lens element with positive power of the first lens unit, and $\phi_{1PR}$ is a power of an image-side surface of the second lens element with positive power of the first lens unit.

2. A zoom lens according to claim 1, wherein both surfaces of the first lens element with negative power of the first lens unit are aspherical.

3. A zoom lens according to claim 1, satisfying the following condition:

$6 \leq N \leq 9$ where N is a total number of lens elements of the zoom lens.

4. A zoom lens according to claim 1, wherein the second lens unit includes three lens elements or less.

5. A zoom lens according to claim 1, wherein the second lens unit comprises a lens element with positive power and a cemented lens component in which a lens element with positive power and a lens element with negative power are cemented.

6. A zoom lens according to claim 5, satisfying the following conditions:

$n_{2pave} > 1.59$ $v_{2n} \leq 35$ where $n_{2pave}$ is an average refractive index value of all lens elements with positive power contained in the second lens unit and $v_{2n}$ is the Abbe's number of the lens element with negative power contained in the second lens unit.

7. A zoom lens according to claim 5, wherein spacing between the lens element and the lens component constituting the second lens unit is smaller than a center thickness of the lens element with negative power contained in the second lens unit.

8. A zoom lens according to claim 1, wherein the second lens unit comprises a cemented lens component in which a lens element with positive power and a lens element with negative power are cemented, and the lens element with negative power of the cemented lens component is smaller in Abbe's number than the lens element with positive power of the cemented lens component.

9. A zoom lens according to claim 8, satisfying the following conditions:

$n_{2pave} \geq 1.59$ $v_{2n} \leq 35$ where $n_{2pave}$ is an average refractive index value of all lens elements with positive power contained in the second lens unit and $v_{2n}$ is the Abbe's number of the lens element with negative power contained in the second lens unit.

10. A zoom lens according to claim 8, wherein spacing between the lens element and the lens component constituting the second lens unit is smaller than a center thickness of the lens element with negative power contained in the second lens unit.

11. A zoom lens according to claim 1, satisfying the following conditions:

$n_{3ave} \geq 1.48$ $v_{3ave} \geq 60$ where $n_{3ave}$ is an average refractive index value of all lens elements constituting the third lens unit and $v_{3ave}$ is an average Abbe's number value of all lens elements constituting the third lens unit.

12. A zoom lens according to claim 1, wherein the third lens unit includes a single lens element having at least one aspherical surface.

13. A zoom lens according to claim 1, wherein the third lens unit includes at least one resin lens element.

14. A zoom lens according to claim 1, wherein the fourth lens unit consists of a single lens element and satisfies the following conditions:

$$n_4 \geq 1.48$$

$$v_4 \geq 60$$

where $n_4$ is a refractive index of the single lens element constituting the fourth lens unit and $v_4$ is an Abbe's number of the single lens element constituting the fourth lens unit.

15. A zoom lens according to claim 1, wherein the fourth lens unit consists of a lens element having at least one aspherical surface.

16. A zoom lens according to claim 1, wherein the fourth lens unit consists of a resin lens element.

17. A zoom lens according to claim 1, wherein the fourth lens unit remains fixed when the magnification is changed.

18. An electronic imaging apparatus comprising:
a zoom lens stated in claim 1;
an electronic image sensor located proximate to an imaging position of the zoom lens;
image processing means; and
recording means,
image data obtained by the electronic image sensor being processed by the image processing means so that a data shape is changed and recorded in the recording means,
wherein, in nearly infinite object point focusing, the zoom lens satisfies the following condition:

$$0.7 < y_{07}/(f_w \cdot \tan \omega_{07w}) < 1.5$$

where $y_{07}$ is expressed by $y_{07} = 0.7 y_{10}$ when $y_{10}$ denotes a distance from a center to a point farthest from the center (the maximum image height) within an effective imaging surface (an imageable surface) of the electronic image sensor and $\omega_{07w}$ is an angle made by a direction of an object point corresponding to an image point, connecting a center of the imaging surface at a wide-angle position and a position of the image height $y_{07}$, with an optical axis.

19. A zoom lens comprising, in order from an object side:
a first lens unit with negative power;
a second lens unit with positive power;
a third lens unit with positive power; and
a fourth lens unit,
wherein when a magnification of the zoom lens is changed in a range from a wide-angle position to a telephoto position, spacing between the first lens unit and the second lens unit is narrowed and spacing between the second lens unit and the third lens unit is widened; an aperture stop moved integrally with the second lens unit is interposed between a most image-side lens element of the first lens unit and a most image-side lens element of the second lens unit; the first lens unit consists of a first lens element with negative power placed on the object side and a second lens element with positive power placed on an image side; and each of the third lens unit and the fourth lens unit consists of only a single meniscus lens element with a concave surface facing the object side.

20. A zoom lens according to claim 19, satisfying the following condition:

$$15 < (\phi 3/\phi 4) < 320$$

where $\phi 3$ is a power of the third lens unit and $\phi 4$ is a power of the fourth lens unit.

21. A zoom lens according to claim 19, satisfying the following condition:

$$-10 < (R_{3r} + R_{4f})/(R_{3r} - R_{4f}) < 0$$

where $R_{3r}$ is a paraxial radius of curvature of an image-side surface of the meniscus lens element constituting the third lens unit and $R_{4f}$ is a paraxial radius of curvature of an object-side surface of the meniscus lens element constituting the fourth lens unit.

22. A zoom lens according to claim 19, satisfying the following condition:

$$1 < ds/dt < 1.5$$

where ds is spacing between a point where a line parallel with an optical axis, traversing a maximum image height position on an imaging surface intersects with an image-side surface of the meniscus lens element constituting the third lens unit and a point where the line intersects with an object-side surface of the meniscus lens element constituting the fourth lens unit at the wide-angle position and dt is spacing on the optical axis between the image-side surface of the meniscus lens element constituting the third lens unit and the object-side surface of the meniscus lens element constituting the fourth lens unit at the wide-angle position.

23. A zoom lens according to claim 19, satisfying the following condition:

$$6 \leq N \leq 9$$

where N is a total number of lens elements of the zoom lens.

24. A zoom lens according to claim 19, wherein the second lens unit includes three lens elements or less.

25. A zoom lens according to claim 19, wherein the second lens unit comprises a lens element with positive power and a cemented lens component in which a lens element with positive power and a lens element with negative power are cemented.

26. A zoom lens according to claim 25, satisfying the following conditions:

$$n_{2pave} \geq 1.59$$

$$v_{2n} \leq 35$$

where $n_{2pave}$ is an average refractive index value of all lens elements with positive power contained in the second lens unit and $v_{2n}$ is the Abbe's number of the lens element with negative power contained in the second lens unit.

27. A zoom lens according to claim 25, wherein spacing between the lens element and the lens component constituting the second lens unit is smaller than a center thickness of the lens element with negative power contained in the second lens unit.

28. A zoom lens according to claim 19, wherein the second lens unit comprises a cemented lens component in which a lens element with positive power and a lens element with negative power are cemented, and the lens element with negative power of the cemented lens component is smaller in Abbe's number than the lens element with positive power of the cemented lens component.

29. A zoom lens according to claim 28, satisfying the following conditions:

$$n_{2pave} \geq 1.59$$

$$v_{2n} \leq 35$$

where $n_{2pave}$ is an average refractive index value of all lens elements with positive power contained in the second lens unit and $v_{2n}$ is the Abbe's number of the lens element with negative power contained in the second lens unit.

30. A zoom lens according to claim 28, wherein spacing between the lens element and the lens component constituting the second lens unit is smaller than a center thickness of the lens element with negative power contained in the second lens unit.

31. A zoom lens according to claim 19, satisfying the following conditions:

$$n_{3ave} \geq 1.48$$

$$v_{3ave} \geq 60$$

where $n_{3ave}$ is an average refractive index value of all lens elements constituting the third lens unit and $v_{3ave}$ is an average Abbe's number value of all lens elements constituting the third lens unit.

32. A zoom lens according to claim 19, wherein the third lens unit has at least one aspherical surface.

33. A zoom lens according to claim 19, wherein the third lens unit includes a resin lens element.

34. A zoom lens according to claim 19, satisfying the following conditions:

$$n_4 \geq 1.48$$

$$v_4 \geq 60$$

where $n_4$ is a refractive index of the single lens element constituting the fourth lens unit and $v_4$ is an Abbe's number of the single lens element constituting the fourth lens unit.

35. A zoom lens according to claim 19, wherein the fourth lens unit has at least one aspherical surface.

36. A zoom lens according to claim 19, wherein the fourth lens unit is made of resin.

37. A zoom lens according to claim 19, wherein the fourth lens unit remains fixed when the magnification is changed.

38. An electronic imaging apparatus comprising:

a zoom lens stated in claim 19;

an electronic image sensor located proximate to an imaging position of the zoom lens;

image processing means; and recording means, image data obtained by the electronic image sensor being processed by the image processing means so that a data shape is changed and recorded in the recording means, wherein, in nearly infinite object point focusing, the zoom lens satisfies the following condition:

$$0.7 < y_{07}/(f_w \cdot \tan \omega_{07w}) < 1.5$$

where $y_{07}$ is expressed by $y_{07} = 0.7\ y_{10}$ when $y_{10}$ denotes a distance from a center to a point farthest from the center (the maximum image height) within an effective imaging surface (an imageable surface) of the electronic image sensor and $\omega_{07w}$ is an angle made by a direction of an object point corresponding to an image point, connecting a center of the imaging surface at a wide-angle position and a position of the image height $y_{07}$, with an optical axis.

* * * * *